US006809904B2

(12) United States Patent
Boutaghou et al.

(10) Patent No.: US 6,809,904 B2
(45) Date of Patent: Oct. 26, 2004

(54) DISC HEAD SLIDER DESIGNS WITH PARTICLE FLUSHING CHANNELS

(75) Inventors: Zine-Eddine Boutaghou, Vadnais Heights, MN (US); Ram Mohan Rao, Roseville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 118 days.

(21) Appl. No.: 10/115,457

(22) Filed: Apr. 3, 2002

(65) Prior Publication Data

US 2003/0058578 A1 Mar. 27, 2003

Related U.S. Application Data

(60) Provisional application No. 60/326,002, filed on Sep. 27, 2001, and provisional application No. 60/325,841, filed on Sep. 27, 2001.

(51) Int. Cl.[7] .............................. G11B 5/60; G11B 21/21
(52) U.S. Cl. ............................... 360/235.8; 360/236.3; 360/235.6; 360/236.1
(58) Field of Search .......................... 360/236.3, 236.1, 360/235.8, 235.4, 236, 235.5, 235.6

(56) References Cited

U.S. PATENT DOCUMENTS

| 4,212,044 A | 7/1980 | Plotto | 360/103 |
|---|---|---|---|
| 4,225,891 A | 9/1980 | Plotto | 360/103 |
| 4,486,798 A | 12/1984 | Feliss et al. | 360/103 |
| 4,510,541 A | 4/1985 | Sasamoto | 360/97 |
| 4,636,894 A | 1/1987 | Mo | 360/103 |
| 4,700,248 A | 10/1987 | Coughlin et al. | 360/103 |
| 5,210,666 A | 5/1993 | Chapin et al. | 360/103 |
| 5,317,465 A | 5/1994 | Chapin et al. | 360/103 |
| 5,345,353 A * | 9/1994 | Krantz et al. | 360/236.6 |
| 5,406,432 A | 4/1995 | Murray | 360/103 |
| 5,467,238 A | 11/1995 | Lee et al. | 360/128 |
| 5,490,025 A | 2/1996 | Dorius et al. | 360/103 |
| 5,726,831 A * | 3/1998 | White | 360/235.5 |
| 5,748,408 A * | 5/1998 | Barrois et al. | 360/236.7 |
| 5,751,517 A | 5/1998 | Agarwal | 360/103 |
| 5,774,304 A | 6/1998 | Crane et al. | 360/103 |
| 5,831,792 A | 11/1998 | Ananth | 360/103 |
| 5,940,249 A | 8/1999 | Hendriks | 360/103 |
| 6,188,547 B1 | 2/2001 | Gui et al. | 360/236.5 |
| 6,356,412 B1 * | 3/2002 | Levi et al. | 360/237 |
| 2002/0012199 A1 | 1/2002 | Polycarpou et al. | 360/236.6 |

FOREIGN PATENT DOCUMENTS

| JP | 54-8514 | 1/1979 |
|---|---|---|
| JP | 56-134354 | 10/1981 |
| JP | 60-13369 | 1/1985 |
| JP | 61-148685 | 7/1986 |
| JP | 1-298585 | 12/1989 |
| WO | WO 99/00792 | 1/1999 |

OTHER PUBLICATIONS

U.S. patent application Ser. No. 10/113,997, Rao, filed Apr. 1, 2002.

* cited by examiner

*Primary Examiner*—Craig A. Renner
(74) *Attorney, Agent, or Firm*—Westman, Champlin & Kelly, P.A.

(57) ABSTRACT

A disc head slider is provided and includes a disc-facing surface. The disc-facing surface comprises an inside set of surface components that includes an inside cavity dam and an inside sub-ambient pressure cavity having an inside cavity floor. The disc-facing surface further comprises an outside set of surface components that includes an outside cavity dam and an outside sub-ambient pressure cavity having an outside cavity floor. The disc-facing surface also comprises a center set of surface components that is generally disposed between the inside and outside sets of surface components. The center set of surface components includes a center cavity dam and a center sub-ambient pressure cavity having a center cavity floor. The inside, outside and center sets of surface components are separate and disassociated from one another.

29 Claims, 15 Drawing Sheets

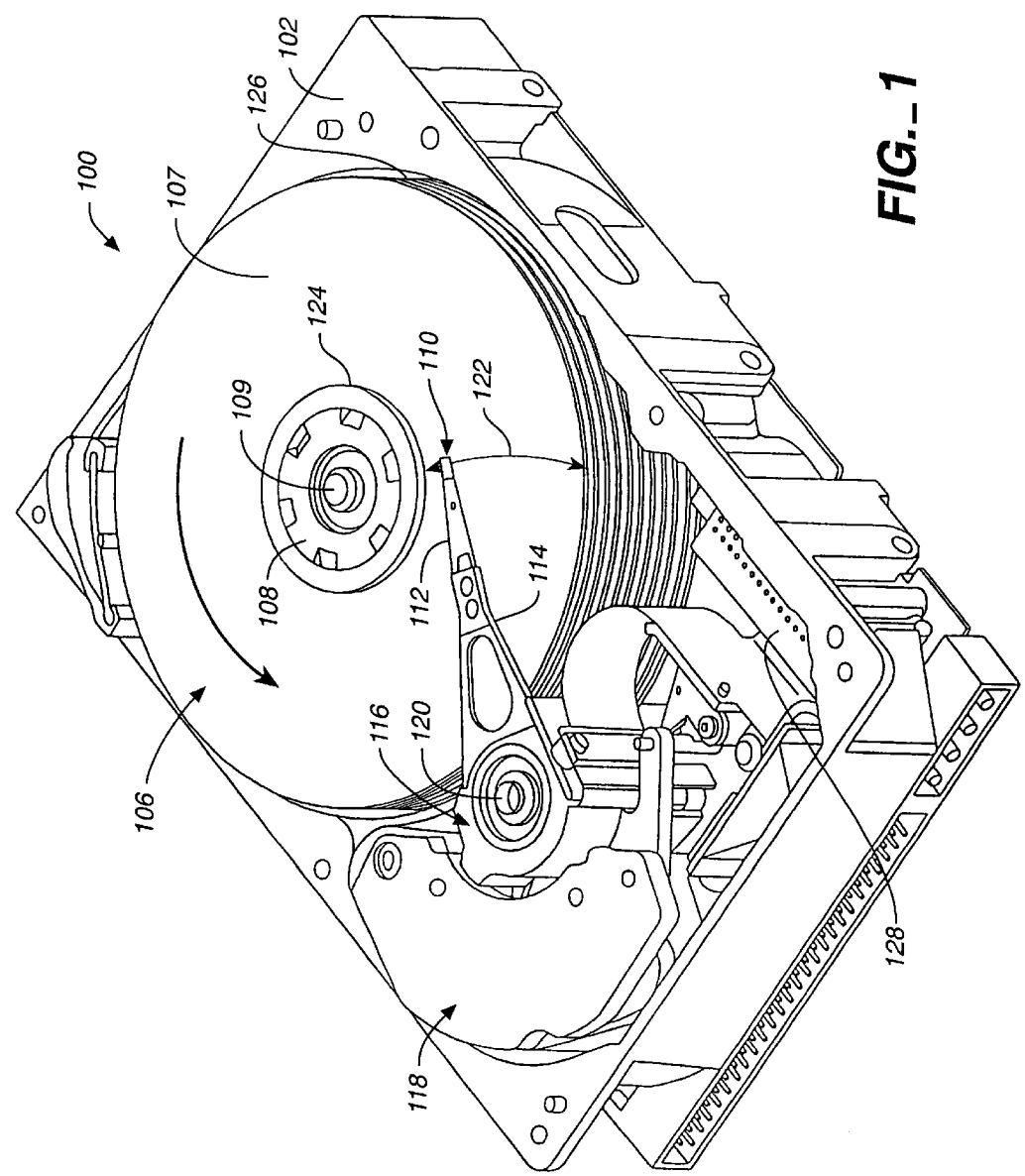
FIG._1

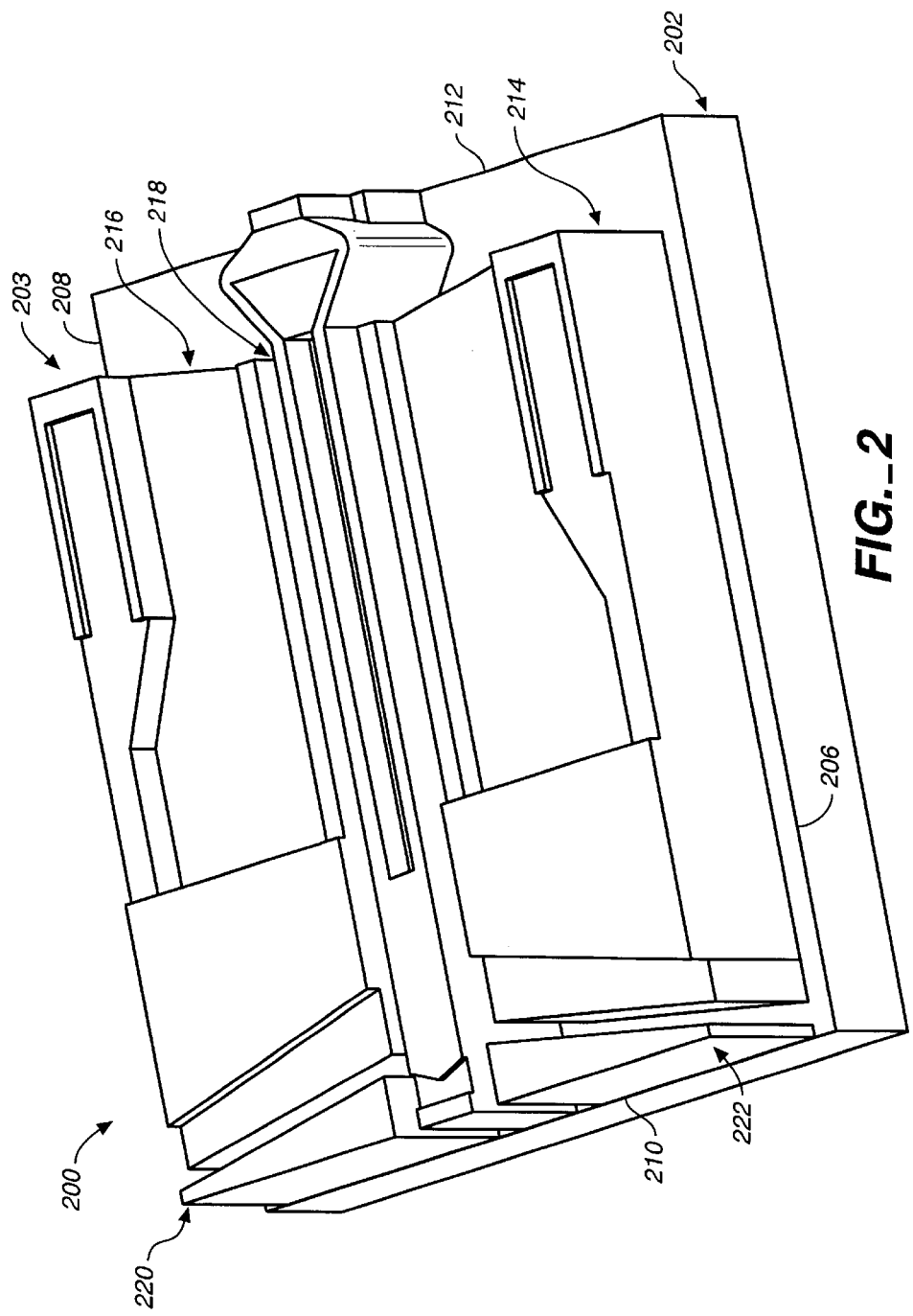
FIG._2

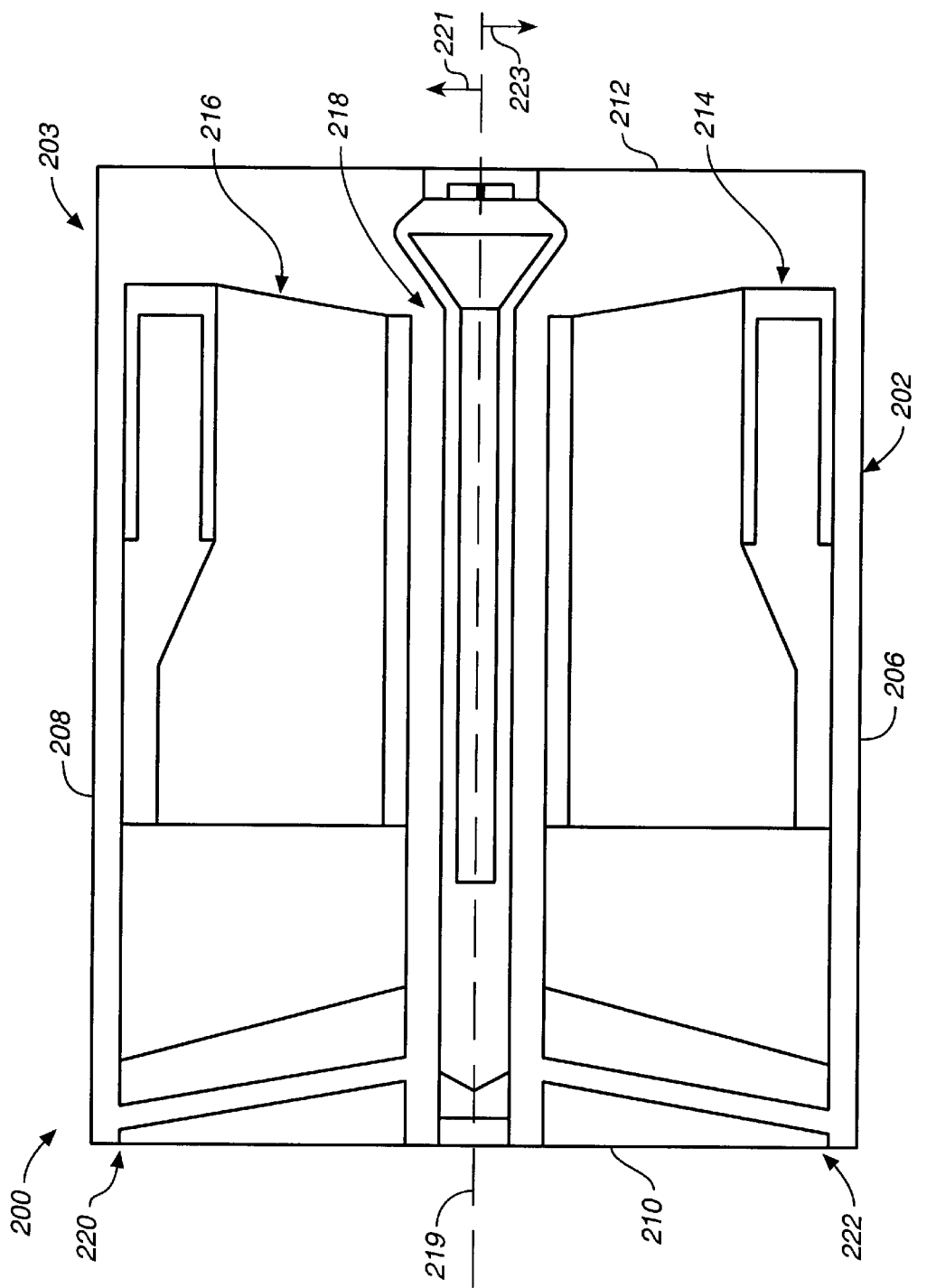
FIG._3

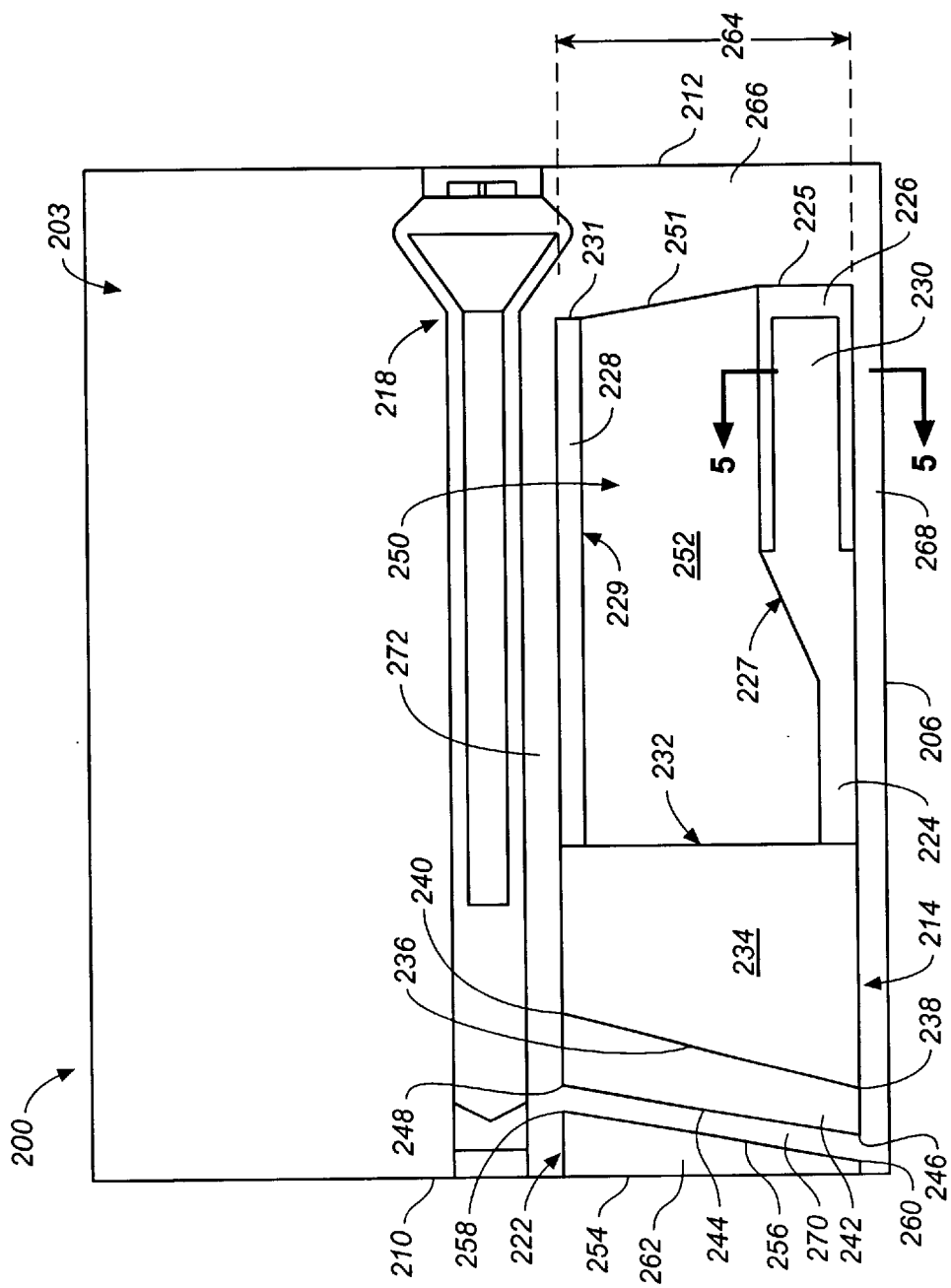
FIG._4

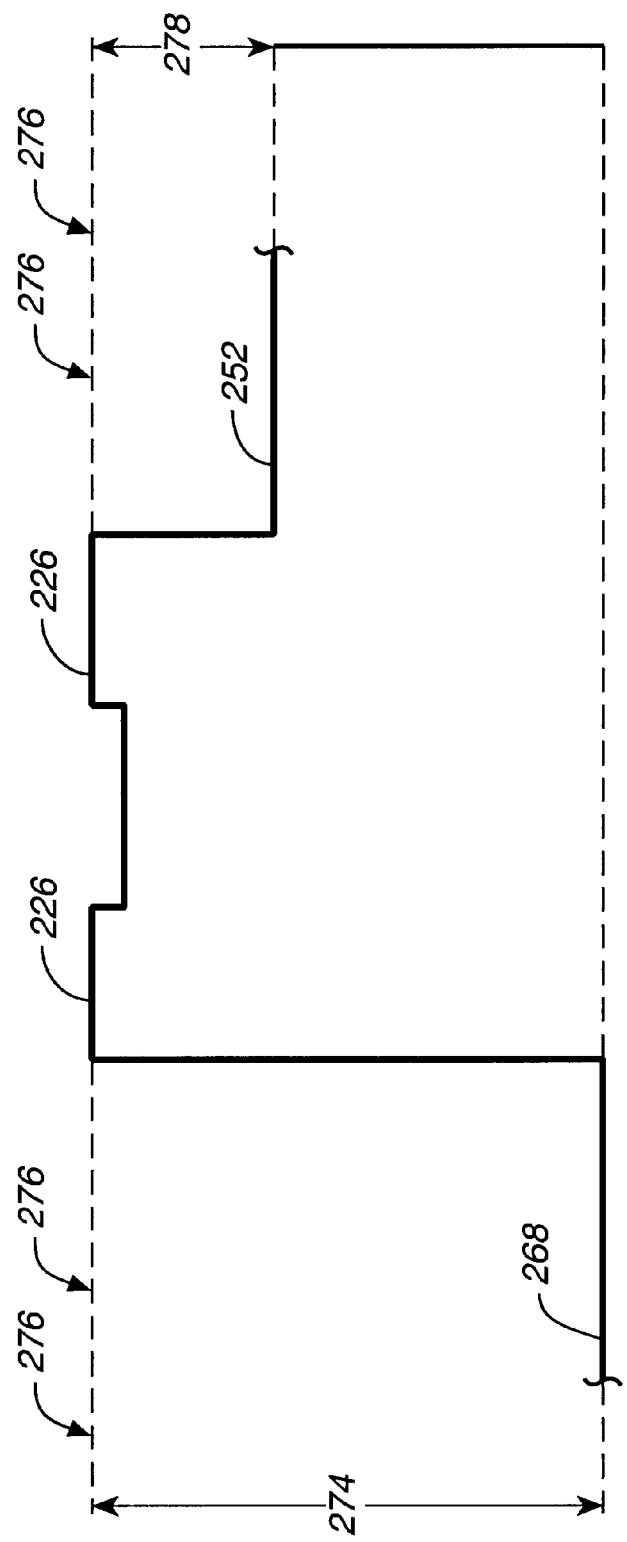

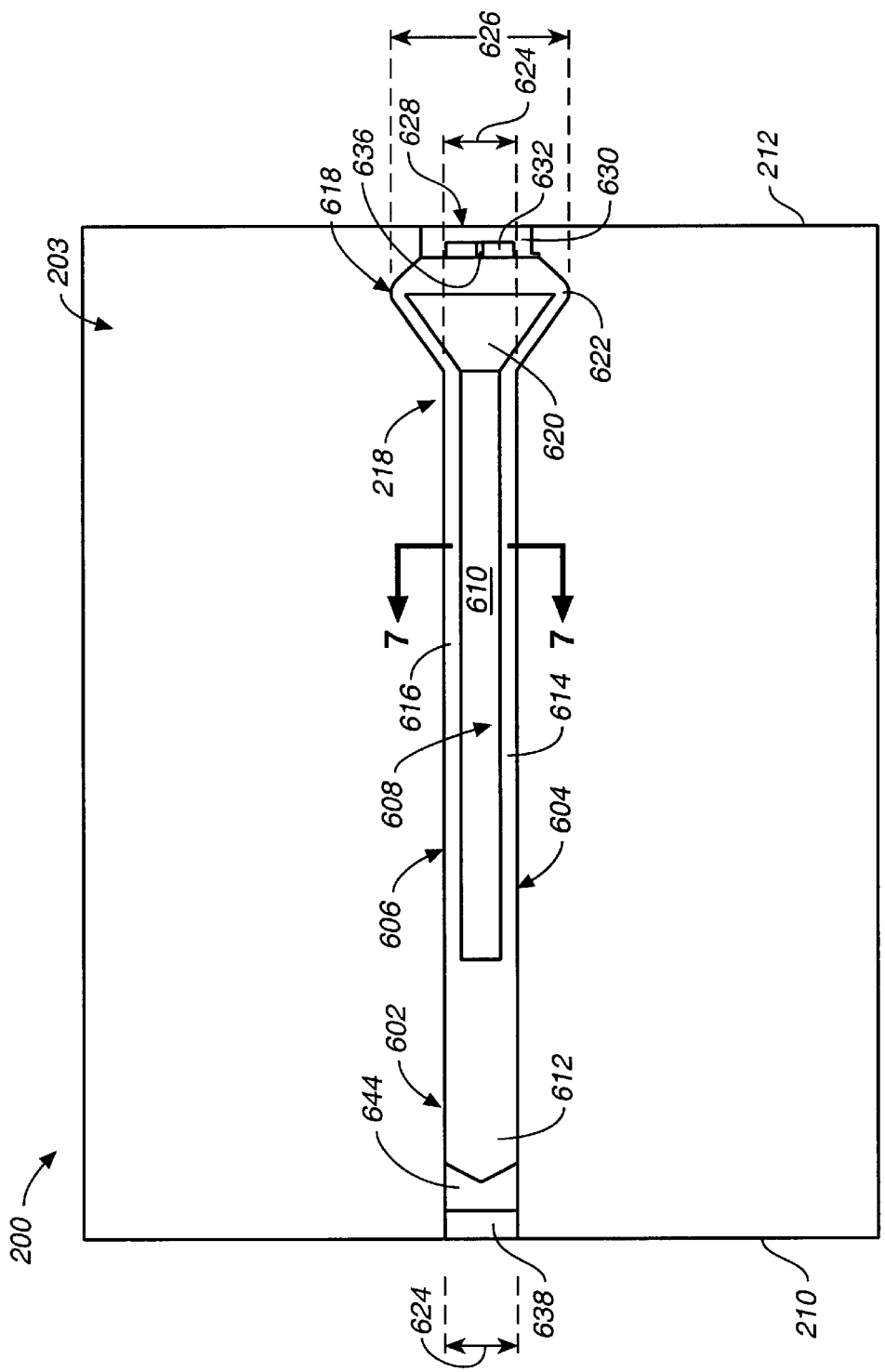
FIG._6

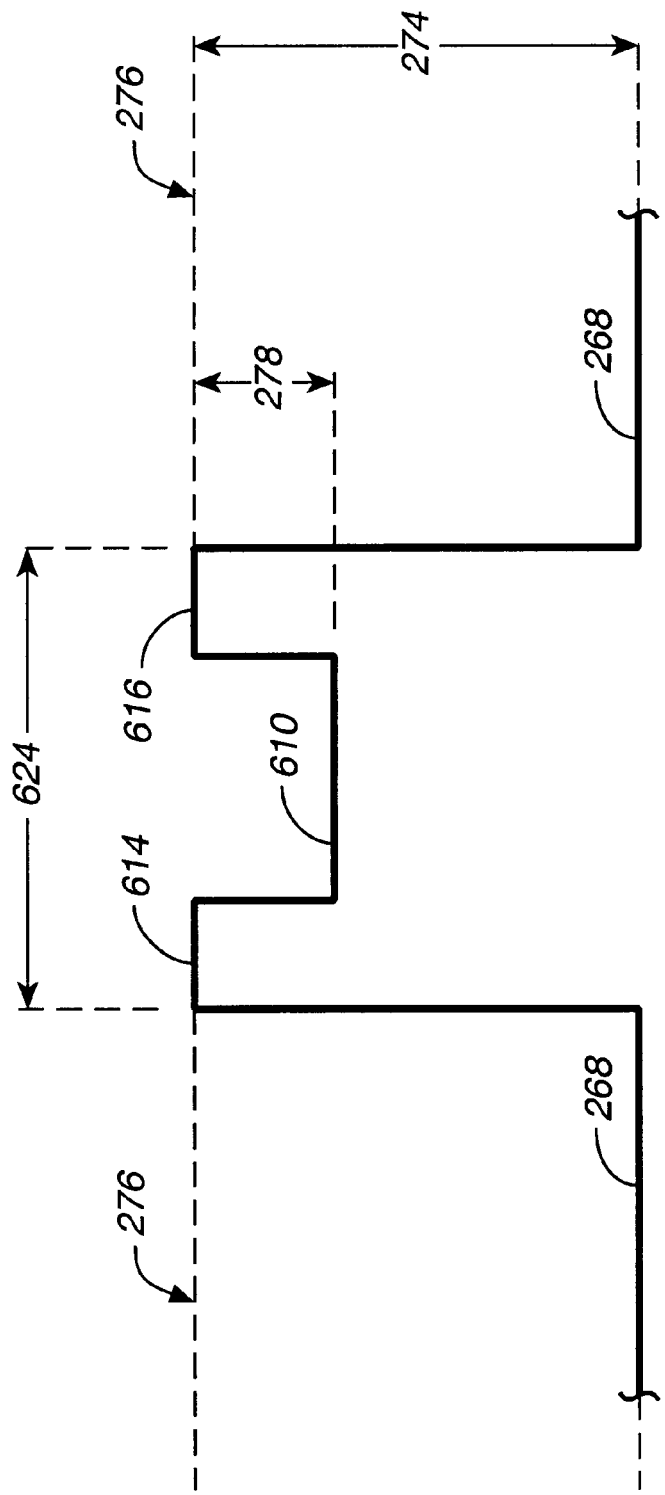
FIG._7

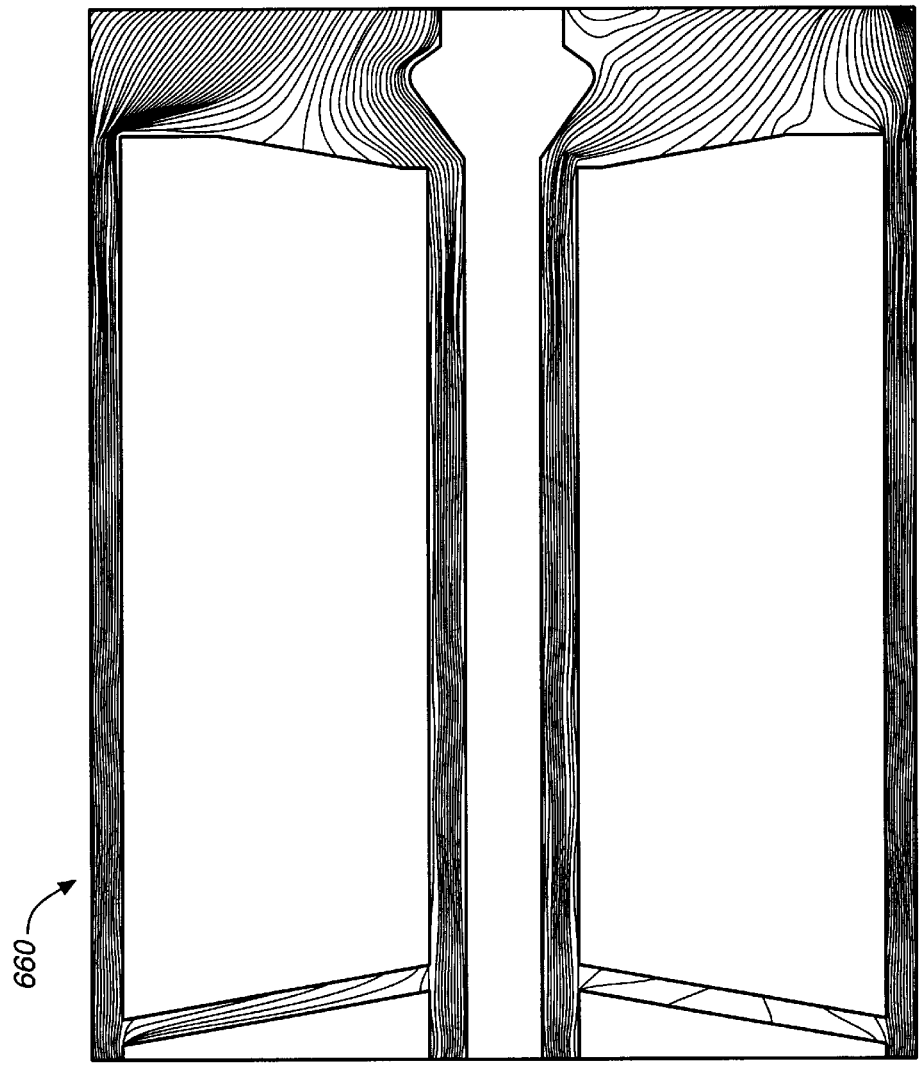
FIG._8

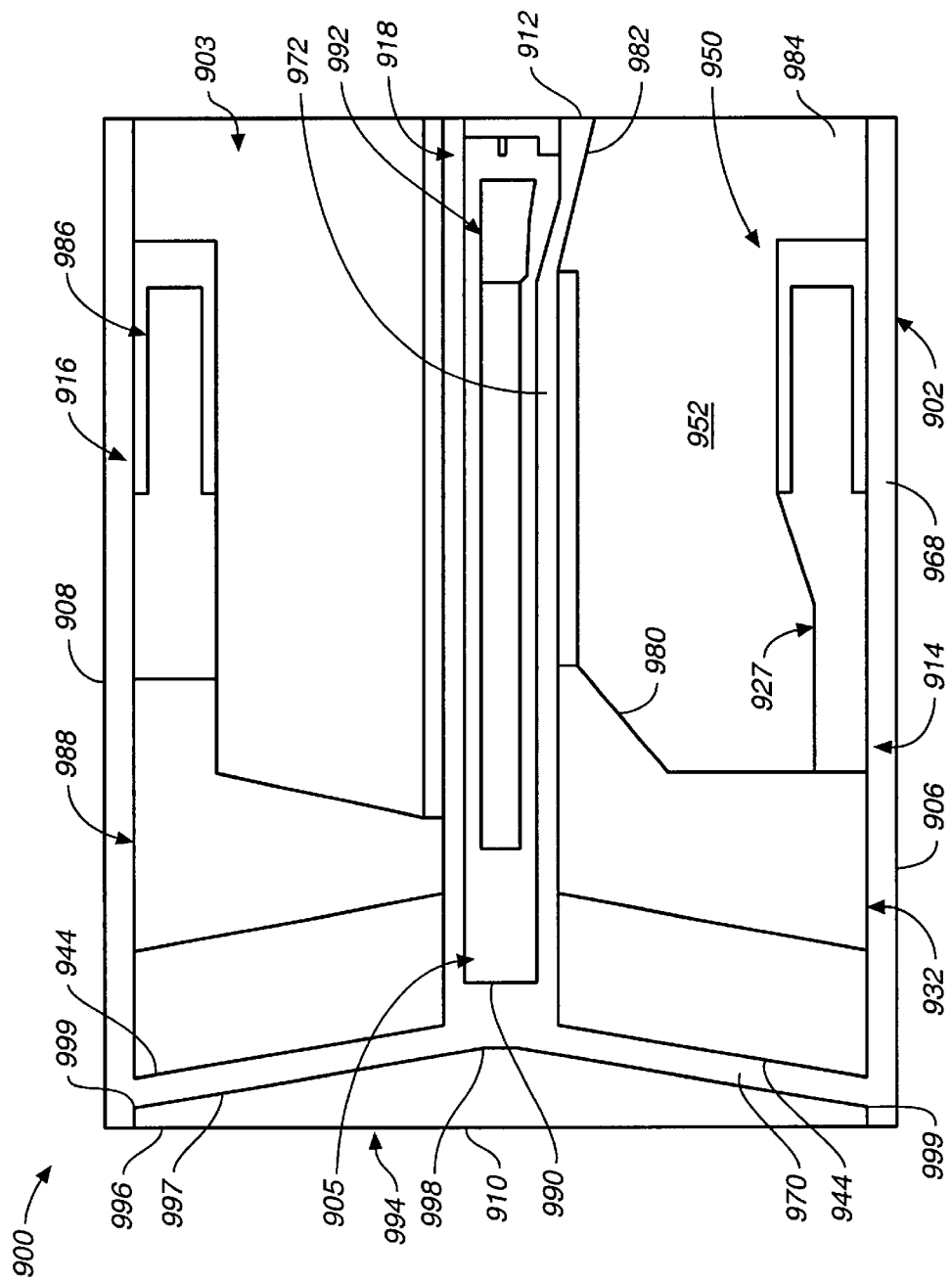

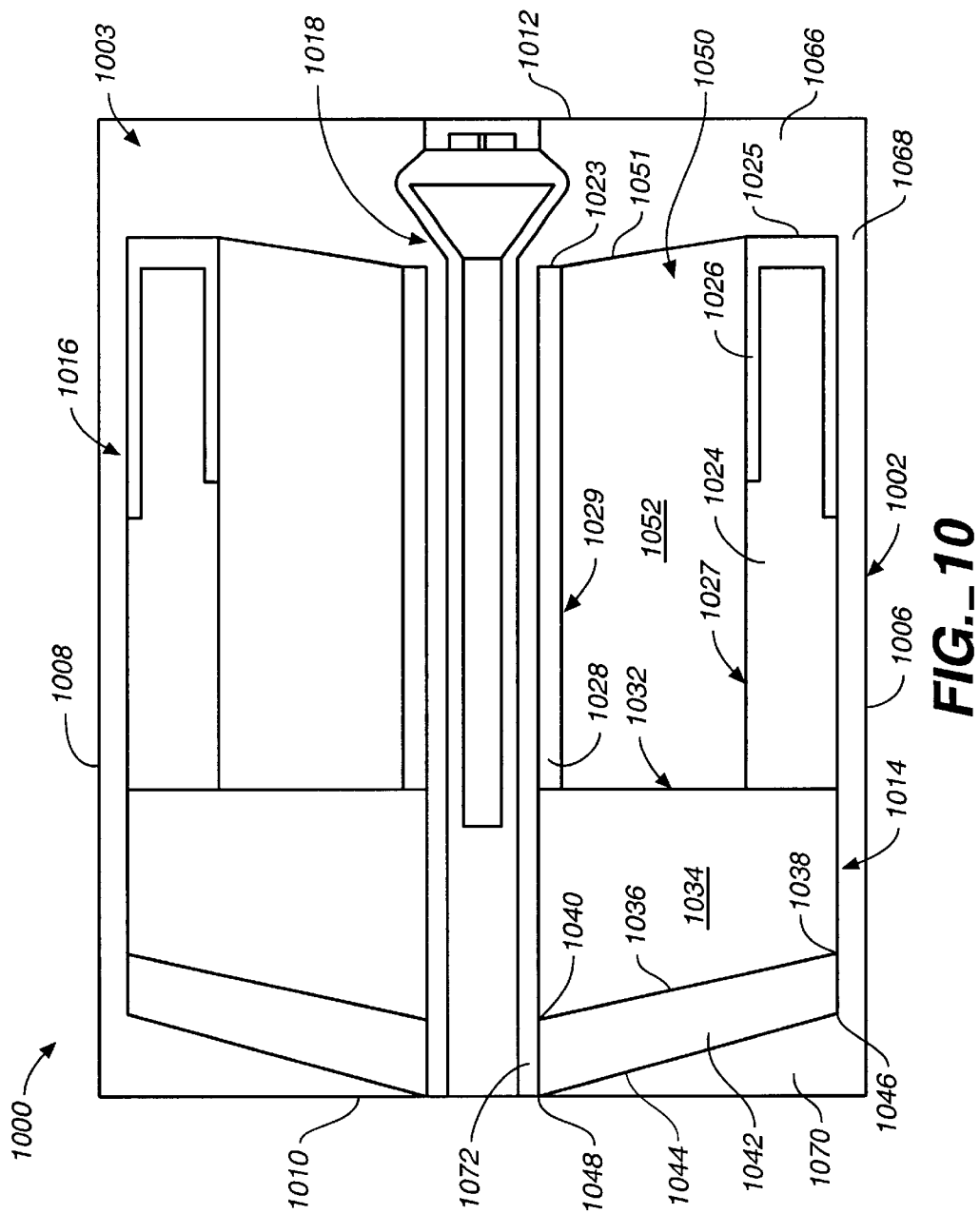
FIG._10

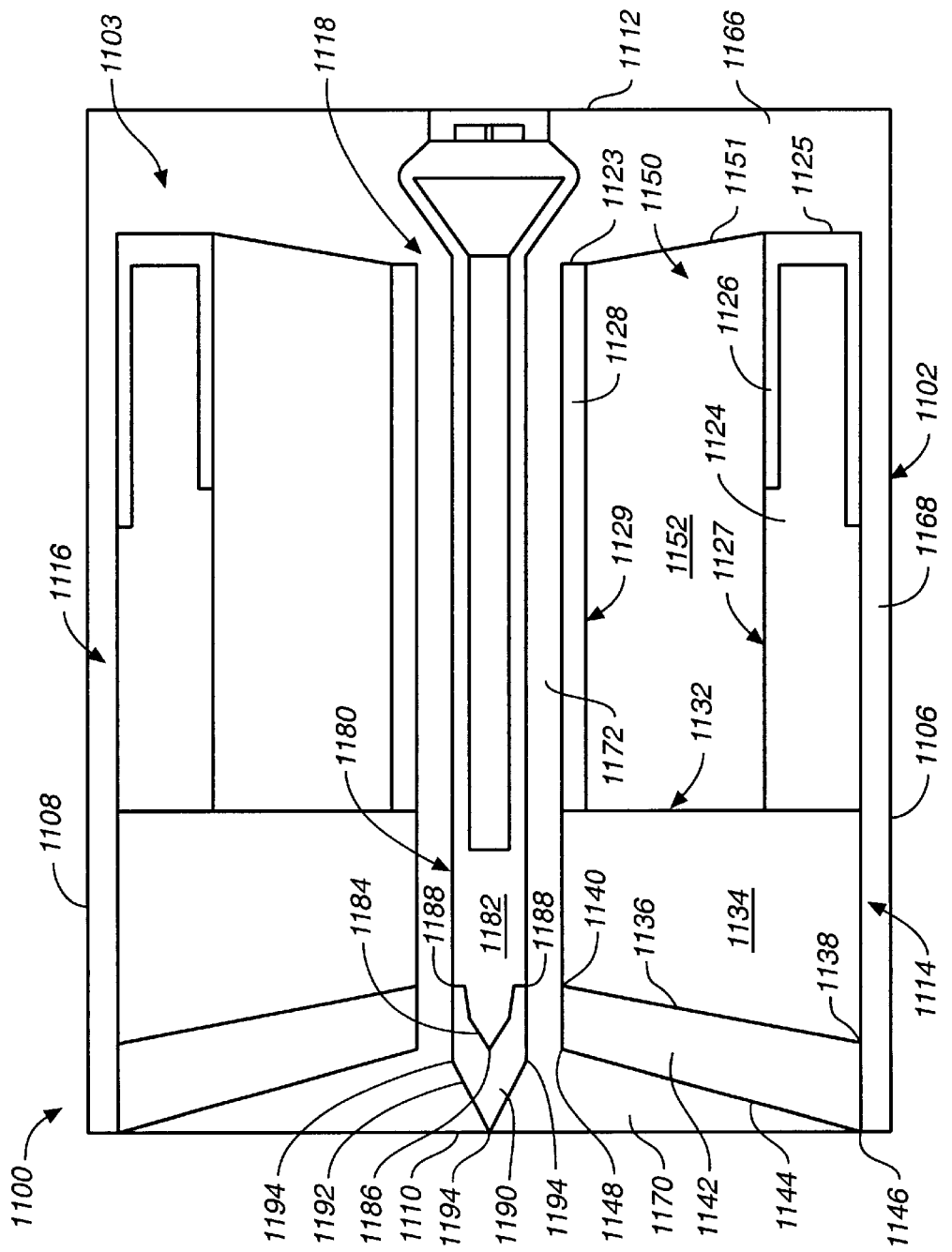
FIG._11

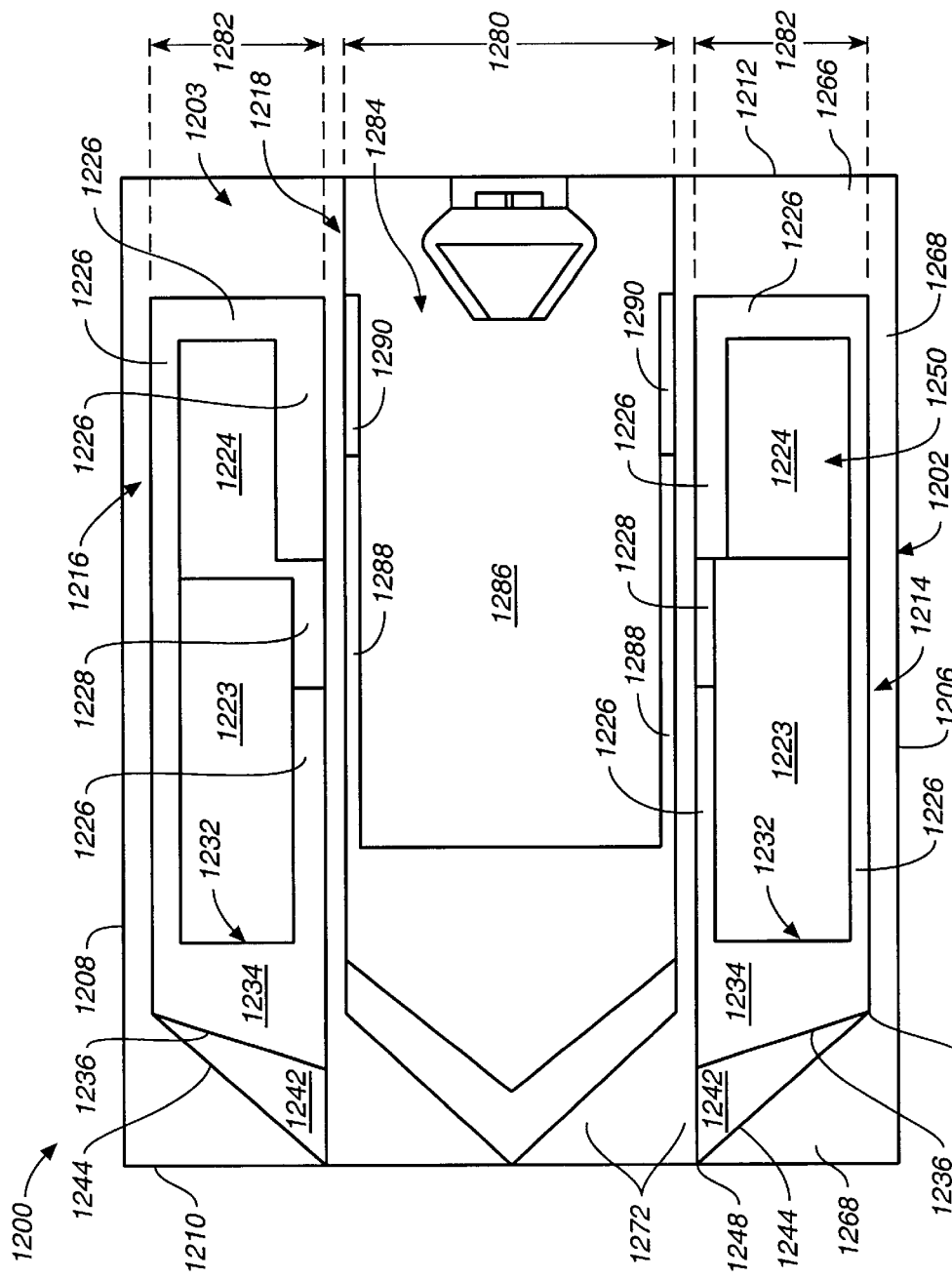
FIG._12

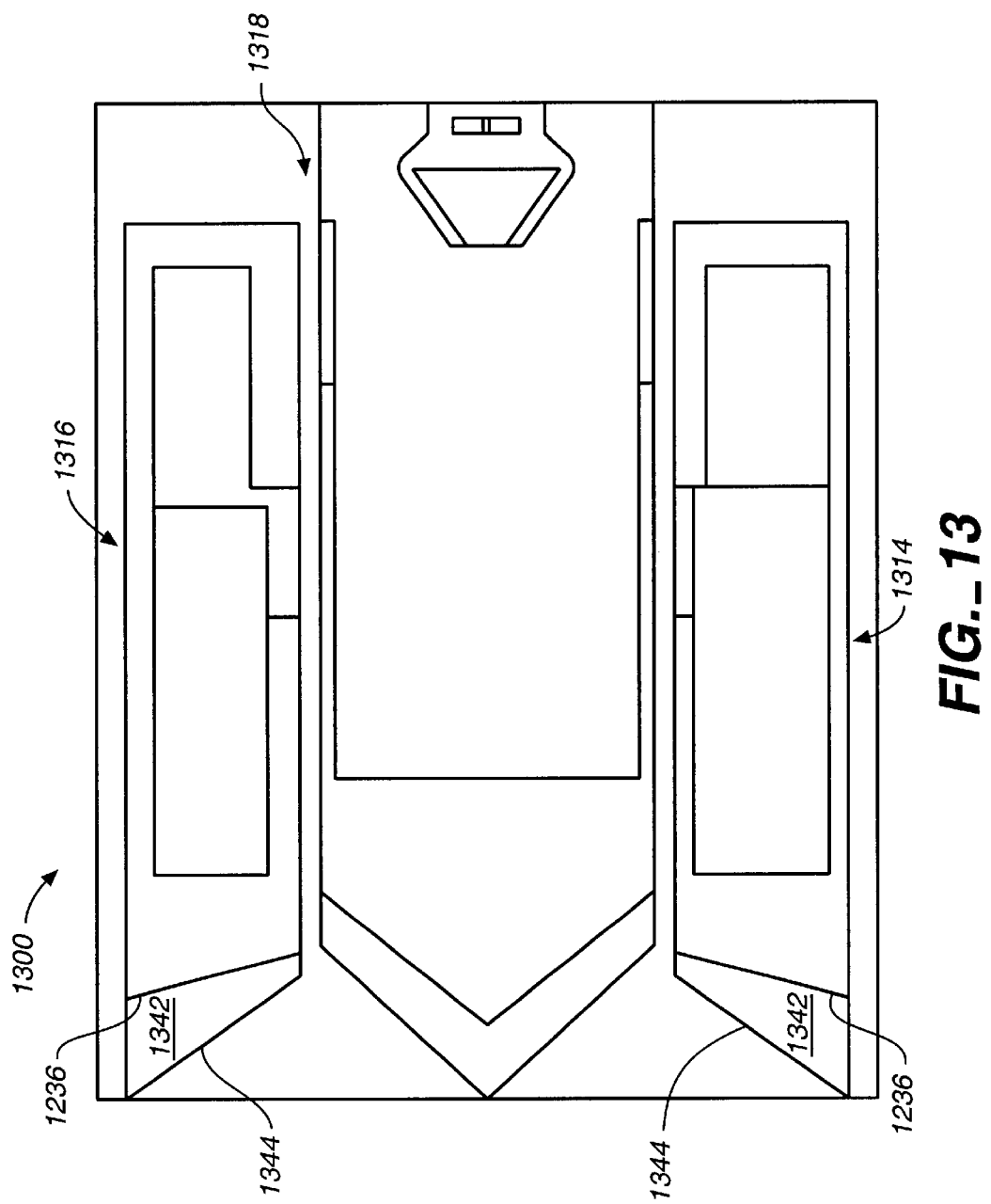
FIG._13

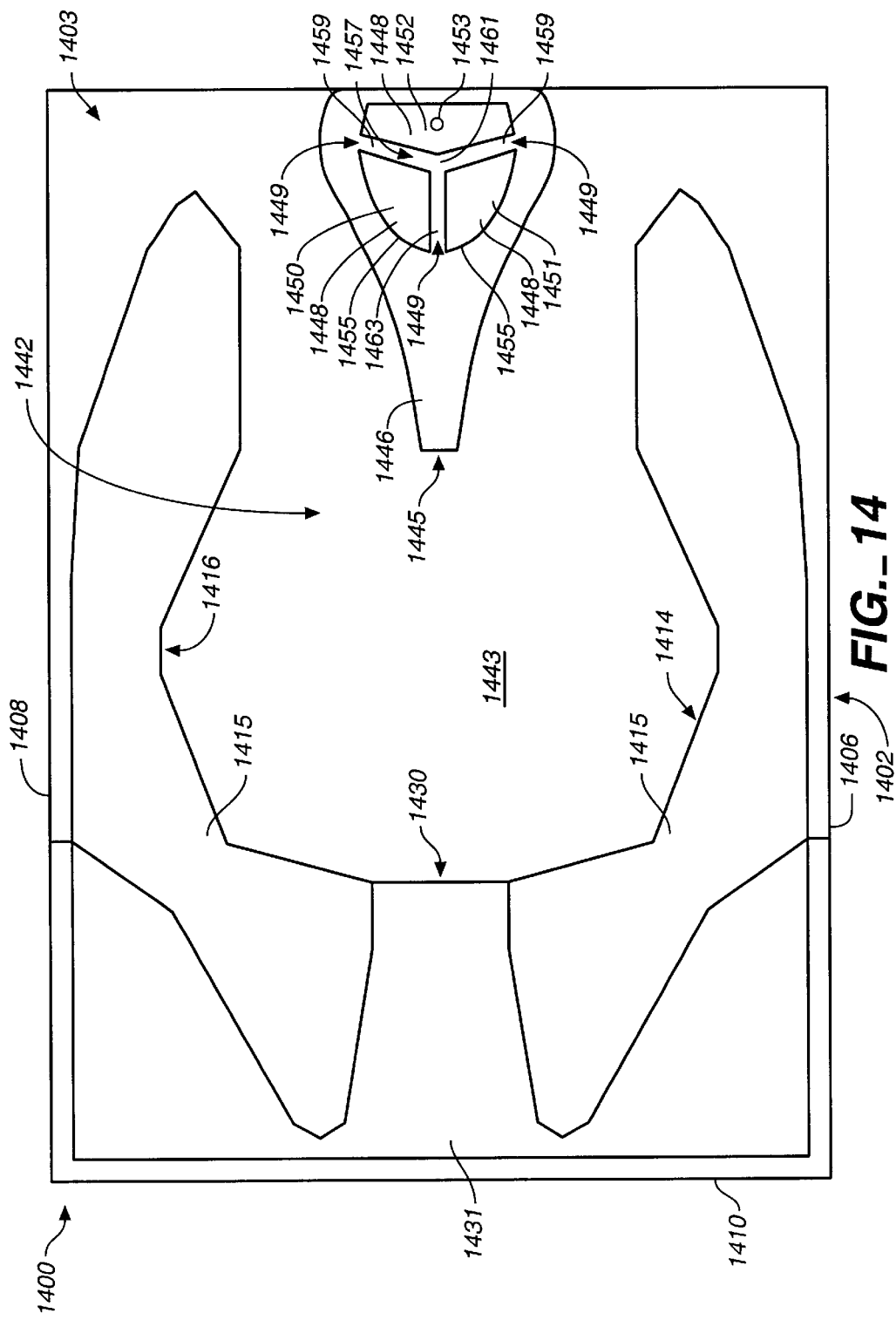
FIG._14

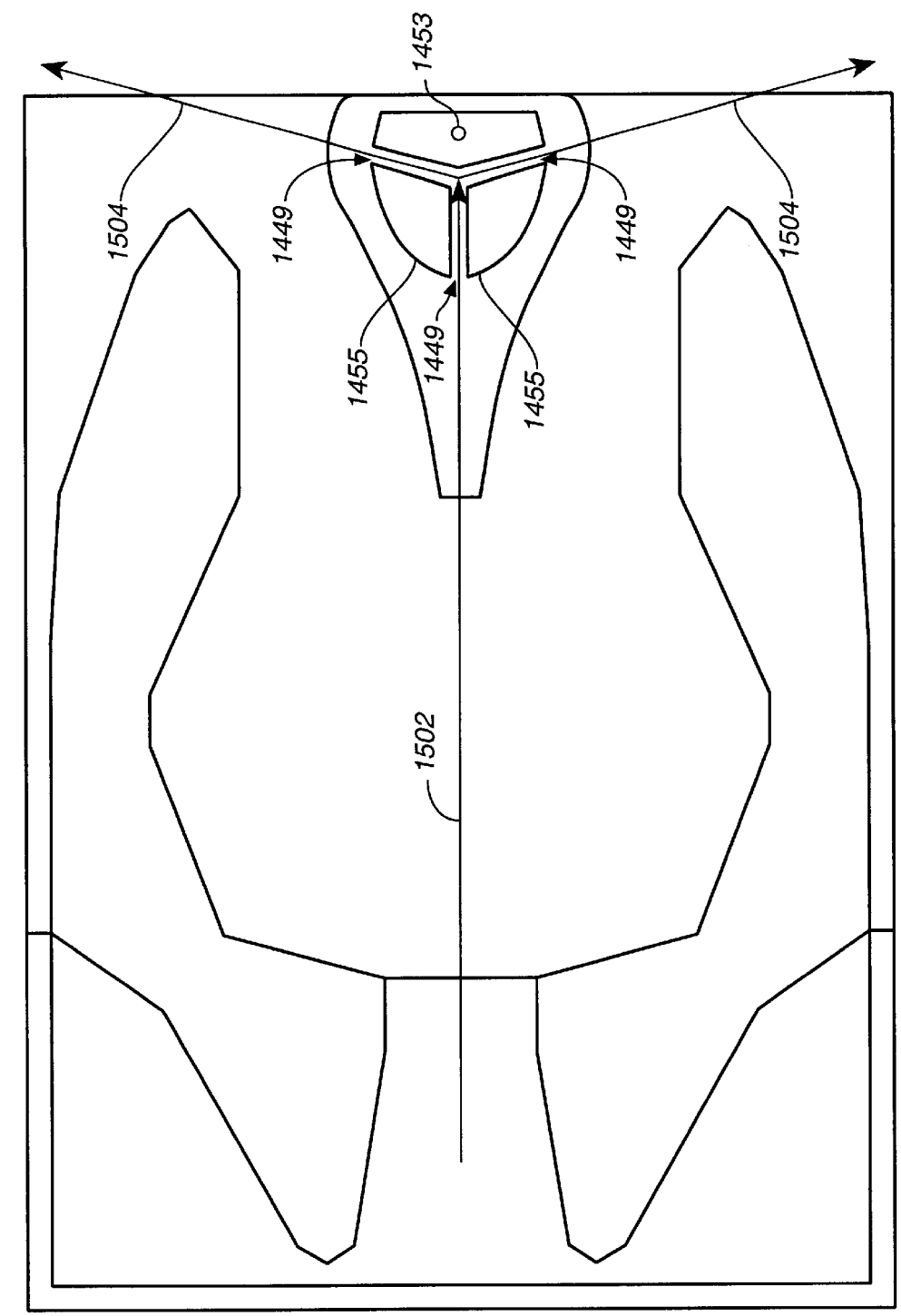
FIG._15

DISC HEAD SLIDER DESIGNS WITH PARTICLE FLUSHING CHANNELS

CROSS-REFERENCE TO RELATED APPLICATION

This application claims priority from U.S. Provisional Application Serial No. 60/325,841 filed on Sep. 27, 2001 for inventors Zine-Eddine Boutaghou and Ram Rao entitled "AIR BEARING DESIGNS WITH PARTICLE FLUSHING CHANNELS"; and also claims priority from U.S. Provisional Application Serial No. 60/326,002 filed on Sep. 27, 2001 for inventors Serge Fayeulle and Anthony Sannino entitled "CHANNELED CENTER PAD SLIDER FOR ENHANCING PARICLE DEFLECTION."

FIELD OF THE INVENTION

The present invention relates generally to disc drive systems, and particularly but not by limitation to disc head sliders within disc drive systems.

BACKGROUND OF THE INVENTION

In data processing systems, disc drives are often used as storage devices. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each slider assembly. The suspension includes a load beam and a gimbal. The load beam provides a load force that forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a sub-ambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" enabling a low bearing clearance for efficient magnetic recording.

The slider typically possess three degrees of freedom (vertical motion, pitch rotation and roll rotation) associated with three applied forces, e.g., pre-load forces and air bearing suction and lift forces. Steady state fly attitude of the entire slider is achieved when these three forces balance each other. Desirably, the fluid bearing underneath the slider maintains a steady state position relative to the media and possesses intrinsic stiffness with respect to its three degrees of freedom, e.g., vertical stiffness, pitch stiffness and roll stiffness.

The bearing clearance between the slider and the disc surface at the recording height is an important parameter to disc drive performance. Efforts have been made to design sliders having specialized features on the disc-facing surface that enable the slider to operate at particularly low fly heights. As slider designs evolve and average flying heights continue to be reduced, contamination particles have been observed to become an increasing source of head modulation leading, in some cases, to read/write failures. Many low fly height slider designs have been observed to disadvantageously encourage an accumulation of contamination particles in the transducer region of the slider. Particles that linger in the transducer region of the slider can lead to irrecoverable data loss.

Embodiments of the present invention provide solutions to these and other problems, and offer advantages over the prior art are.

SUMMARY OF THE INVENTION

The present invention relates to data storage devices that include disc head sliders having disc-facing surface configurations that address the above-mentioned problems.

One embodiment of the present invention pertains to a disc head slider that includes a disc-facing surface. The disc-facing surface comprises an inside set of surface components that includes an inside cavity dam and an inside sub-ambient pressure cavity having an inside cavity floor. The disc-facing surface further comprises an outside set of surface components that includes an outside cavity dam and an outside sub-ambient pressure cavity having an outside cavity floor. The disc-facing surface also comprises a center set of surface components that is generally disposed between the inside and outside sets of surface components. The center set of surface components includes a center cavity dam and a center sub-ambient pressure cavity having a center cavity floor. The inside, outside and center sets of surface components are separate and disassociated from one another.

Another embodiment of the present invention pertains to a disc head slider comprising a disc-facing surface having a peripheral edge. The peripheral edge includes a leading edge, a trailing edge and side edges joining the leading edge and the trailing edge. The disc-facing surface further comprises a first set of surface components that includes a first cavity dam and a first sub-ambient pressure cavity having a first cavity floor. The disc-facing surface also comprises a second set of surface components that includes a second cavity dam and a second sub-ambient pressure cavity having a second cavity floor. The first set of surface components is positioned between the second set of surface components and a side edge. The disc-facing surface further comprises a leading surface component generally positioned between the leading edge and the first set of surface components. A plurality of recessed surfaces generally surround the first set of surface components and separate the first set of surfaces components from the second set of surface components, the leading surface component, the trailing edge and the side edge.

Yet another embodiment pertains to a disc drive that includes a disc rotatable about a central axis. The disc has a recording surface. The disc drive also includes disc head slider means for carrying a transducer at a fly height relative to the recording surface during rotation of the disc and for affecting mass flow during rotation of the disc.

Still another embodiment pertains to a disc head slider having a disc-facing surface. The disc-facing surface includes a cavity dam and a sub-ambient pressure cavity having a cavity floor. The disc-facing surface also includes an inside rail disposed on a first side of the sub-ambient pressure cavity, and an outside rail disposed on a second side of the sub-ambient pressure cavity. The disc-facing surface also includes a center pad having a step surface and a bearing surface. A "Y" shaped channel is formed in the bearing surface.

Other features and benefits that characterize embodiments of the present invention will be apparent upon a reading of the following detailed description and review of the associated drawings.

BRIEF DESCRIPTION OF THE DRAWINGS

FIG. 1 is an isometric view of a disc drive.

FIG. 2 is a perspective view of a slider in accordance with an illustrative embodiment of the present invention.

FIG. 3 is a plan view of the slider of FIG. 2.

FIG. 4 is the plan view of FIG. 3 with portions omitted for clarity.

FIG. 5 is a cross-sectional view taken along line 5—5 in FIG. 4.

FIG. 6 is the plan view of FIG. 3 with portions omitted for clarity.

FIG. 7 is a cross-sectional view taken along line 7—7 in FIG. 6.

FIG. 8 is a schematic diagram that depicts illustrative operational mass flow lines for the slider of FIG. 2.

FIG. 9 is plan view of a slider in accordance with another illustrative embodiment of the present invention.

FIG. 10 is a plan view of a slider in accordance with another illustrative embodiment of the present invention.

FIG. 11 is plan view of a slider in accordance with another illustrative embodiment of the present invention.

FIG. 12 is a plan view of a slider in accordance with another illustrative embodiment of the present invention.

FIG. 13 is plan view of a slider in accordance with another illustrative embodiment of the present invention.

FIG. 14 is a plan view of a slider in accordance with another illustrative embodiment of the present invention.

FIG. 15 is a schematic illustration of the slider of FIG. 14.

DETAILED DESCRIPTION OF ILLUSTRATIVE EMBODIMENTS

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 128 based on signals generated by sliders 110 and a host computer (not shown). Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic lifting force that counteracts the load force provided by suspensions 112 and causes the sliders 110 to lift and fly above or in close proximity to the disc surfaces.

In accordance with an embodiment of the present invention, sliders 110 include specialized features formed in their surfaces that face discs 107. Illustratively, some of these specialized features enable reductions in the undesirable accumulation of contamination particles in the transducer regions of sliders 110. Also, some of these specialized features illustratively enable beneficial slider flight performance characteristics, such as a desirable pitch and/or roll stiffness. Precisely which flight performance characteristics are beneficial or desirable is dependent at least upon the nature and environment of a given slider application.

FIG. 2, in accordance with one aspect of the present invention, is a perspective view of a slider 200 as viewed from the surface of a disc, e.g., disc 107 (FIG. 1). The vertical dimensions are exaggerated in FIG. 2 for clarity. FIG. 3 is a plan view of slider 200 as viewed from the surface of a disc. Slider 200 is illustratively designed to operate in a manner similar to the operation of slider 110 described in relation to FIG. 1.

Slider 200 is formed of a substrate having a slider body 202 that includes a disc-facing surface 203. Disc-facing surface 203 includes an inside edge 206, an outside edge 208, a leading edge 210 and a trailing edge 212. Disc-facing surface 203 also includes a variety of features disposed between those edges. For example, disc-facing surface 203 includes an inside set 214 of surface components, an outside set 216 of surface components, a center set 218 of surface components, an outside-leading surface component 220 and an inside-leading surface component 222. Each of these disc-facing surface 203 features and various specific individual surfaces associated therewith will be described in detail below.

As will be described below, at least one and potentially several of the disc-facing surface 203 features include a bearing surface. When slider 200 is operatively positioned relative a disc (e.g., disc 107 in FIG. 1), the bearing surface(s) will generally extend further towards the disc than the other surfaces. In other words, the bearing surface(s) will extend to a position that is closer to the disc than the position of other surfaces. Illustratively, the bearing surface(s) are generally positioned within a plane that, for the purpose of the present description, will be referred to as the bearing surface plane. In accordance with one embodiment, slider 200 includes multiple bearing surfaces that are generally co-planar with the bearing surface plane and are therefore positioned approximately the same distance from the disc (e.g., disc 107).

It should be pointed out that it is common for disc head sliders, such as slider 200, to include a slight curvature in their length and/or width directions. Such curvatures are commonly referred to as slider crown curvature and slider cross curvature. Accordingly, it is to be understood that the surfaces and surface planes described herein, including the bearing surface plane, may reflect slider crown and/or cross curvature, rather than being disposed in a perfectly flat plane.

For the purpose of the present description, references will be made to surfaces having a relative depth. For example, one surface might have a depth that is greater or less than the depth of another surface. It should be assumed that the described depths are measured from the bearing surface plane. Therefore, "depths," as that term is used in the present description are measured from a plane that is generally co-planar with at least one described bearing surface. A surface having a deep or large depth will be further displaced from the bearing surface plane than a surface having a shallow or small depth. A bearing surface will illustratively be assigned a depth value of 0.

As is illustrated in FIG. 3, disc-facing surface 203 includes a center line 219. Disc-facing surface 203 includes an outside side 221 (generally above center line 219) and an inside side 223 (generally below center line 219). Illustratively, disc-facing surface 203 is symmetrically configured such that disc-facing surface 203 components on the outside side 221 are generally the mirror image equivalent of disc-facing surface 203 components on the inside side 223. Accordingly, the inside set 214 of surface components is generally the mirror image equivalent of the outside set 216 of surface components. Similarly, inside-leading surface component 222 is generally the mirror image equivalent of outside-leading surface component 220. It should be noted that disc-facing surface 203 need not necessarily be symmetrically configured. Disc-facing surface 203 could be configured such that disc-facing surface 203 components on the outside side 221 are differently configured than disc-facing surface 203 components on the inside side 223. The illustrated configuration of disc-facing surface 203 should be considered but one example of a wide variety of embodiments within the scope of the present invention.

The present description will proceed by describing in detail the inside set 214 of surface components, the center set 218 of surface components, the inside-leading surface component 222 and a plurality of recessed surfaces that separate and divide those particular disc-facing surface features. In other words, the description will focus primarily on the inside side 223 of disc-facing surface 203 (FIG. 3). Because the outside side 221 is essentially the mirror image equivalent of the inside side 223, less attention will be given to describing outside side 221.

FIG. 4 is the same plan view of slider 200 as is shown in FIG. 3, except that for the purpose of clarity, the outside set 216 of surface components and the outside-leading surface component 220 are not shown. The inside set 214 of surface components includes an inside rail 227 and an outside rail 229. Inside rail 227 has a rail step surface 224 and a rail bearing surface 226. Outside rail 229 includes a rail step surface 228. Generally speaking, rail step surfaces 224 and 228 are offset in depth from rail bearing surface 226. In other words, rail bearing surface 226 extends further toward the disc (e.g., disc 107 in FIG. 1) than do rail step surfaces 224 and 228. Rail step surfaces 224 and 228 therefore have a deeper or greater depth than rail bearing surface 226 (e.g., because surface 226 is a bearing surface, it illustratively has a depth value of 0). In accordance with one embodiment, rail surfaces 228 are configured to be bearing surfaces, illustratively having a depth value of zero, rather than being configured to be step surfaces that are displaced in depth from the bearing surface plane.

As is illustrated, a portion 230 of rail step surface 224 extends within a generally (U) shaped area within the rail bearing surface 226. Accordingly, considering the relative depths of rail step surface 224 and rail bearing surface 226, the rail bearing surface 226 is generally open to fluid flow (e.g., air flow) on its leading side but generally closed to fluid flow on its trailing side. During operation of slider 200 within a disc drive environment (e.g., see slider 110 in FIG. 1), the illustrated rail configuration illustratively causes particular patterns of fluid flow (e.g., air flow) and therefore particular resulting pressure patterns. The resulting pressure patterns illustratively aid at least in the control of the pitch and roll of slider 200 during operation and, depending on the nature of a given slider application, may be desirable for other reasons related to slider operational performance.

It should be noted that the illustrated configuration of rail surfaces 224, 226 and 228 is not critical to the present invention. Rails 227 and 229 could have shapes other than those illustrated without departing from the scope of the present invention. Different rail shapes and rail surface configurations will present different pressure patterns during operation. Different pressure patterns might be desirable depending on the nature of a given slider application and/or slider environment. The specifically described and illustrated rail surface configurations and shapes, as well as other rail surface configurations and shapes, should be considered within the scope of the present invention.

The inside set 214 of surface components also includes a cavity dam 232 that illustratively, although not necessarily, abuts rails 227 and 229. Cavity dam 232 has a cavity dam upper surface 234 that illustratively, although not necessarily, forms a bearing surface. Cavity dam 232 also includes a cavity dam upper surface leading edge 236 that is generally angled from a leading edge inside corner point 238 to a leading edge outside corner point 240. Point 240 is generally further displaced from leading edge 210 of disc-facing surface 203 than point 238. Cavity dam 232 also includes a cavity dam leading surface 242. Cavity dam leading surface 242 has a leading surface edge 244 that is angled from a leading edge inside corner point 246 to a leading edge outside corner point 248. Point 248 is generally further displaced from leading edge 210 than point 246.

In accordance with one embodiment, cavity dam leading surface 242 is generally flat and offset in depth from cavity dam upper surface 234, and is also offset in depth from the bearing surface plane. In other words, cavity dam upper surface 234 generally extends further towards the disc (e.g., disc 107 in FIG. 1) than surface 242. Cavity dam leading surface 242 therefore has a deeper or greater depth than cavity dam upper surface 234. Leading surface edge 244 illustratively has a deep depth (e.g., same depth as surface 242) and upper surface leading edge 236 has a shallower depth (e.g., same depth as surface 234).

Generally speaking, cavity dam upper surface 234 has a smaller or shallower depth than rail step surfaces 224 and 228, and a smaller or shallower depth than cavity dam leading surface 242. In accordance with one embodiment, cavity dam upper surface 234 has the same general depth as rail bearing surface 226 (e.g., surface 234 is also a bearing surface). In accordance with another embodiment, rail step surfaces 224 and 228 have the same general depth as cavity dam leading surface 242. The relative depths of the different surfaces described herein should be considered examples only. Other depth relationships between the different surfaces of the slider embodiments described herein should be considered within the scope of the present invention.

The inside set 214 of surface components further includes a sub-ambient pressure cavity 250. Sub-ambient pressure cavity 250 is generally positioned between inside rail 227, outside rail 229 and cavity dam 232. Sub-ambient pressure cavity 250 includes a cavity floor 252. Illustratively, although not necessarily, sub-ambient pressure cavity floor 252 extends approximately as far towards trailing edge 212 as do rails 227 and 229.

Inside rail 227 illustratively includes a trailing end 225 that is displaced from trailing edge 212. Outside rail 229 illustratively includes a trailing end 231 that is further displaced from trailing edge 212 than trailing end 225. As is illustrated, sub-ambient pressure cavity 250 has a trailing edge 251 that is angled and extends between rail trailing end 231 and rail trailing end 225. In accordance with one embodiment, rail trailing end 231 and rail trailing end 225 are equally displaced from trailing edge 212 of disc-facing surface 203. In this case, trailing edge 251 is generally non-angled and in the same general plane as trailing ends 231 and 225.

Disc-facing surface 203 further includes an inside-leading surface component 222 having a leading edge 254 that is positioned proximate to, and in accordance with one embodiment, is generally co-planar with leading edge 210. Surface component 222 also includes an angled trailing edge 256 having an outside edge corner point 258 that is further displaced from leading edge 210 of disc-facing surface 203 than an inside edge corner point 260. Illustratively, angled trailing edge 256 is displaced from, and is substantially in parallel alignment with, leading edge 244 of cavity dam leading surface 242. Surface component 222 further includes a surface 262. In accordance with one embodiment, surface 262 is a bearing surface. In accordance with another embodiment, surface 262 is displaced from the bearing surface plane. For example, surface 262 can have a depth that is the same as the depth of cavity dam leading surface 242 and/or rail step surfaces 224 and 228. The inside-leading surface component 222 and the inside set 214 of surface components illustratively have the same width or a substantially similar width. This width is identified and labeled width 264 in FIG. 4. Width 264 is illustratively the width of cavity dam 232.

Disc-facing surface 203 further includes a plurality of recessed surfaces that generally separate and divide surface component 222 and surface component sets 214 and 218 from one another. Specifically, disc-facing surface 203 includes an inside-trailing recessed surface 266, an inside-edge recessed surface 268, an inside-leading recessed surface 270 and an inside-center recessed surface 272. In combination, the recessed surfaces 266, 268, 270 and 272 generally surround the inside set 214 of surface components. A similar set (mirror image reversed set) of recessed surfaces illustratively surrounds the outside set 216 of surface components. In order to simplify the present description, only the recessed surfaces that surround set 214 of surface components will be described in detail.

Recessed surface 266 is generally positioned between trailing edge 212 of disc-facing surface 203 and rail/cavity trailing edges 231, 225 and 251. Recessed surface 266 generally extends between recessed surfaces 268 and 272. Recessed surface 268 is generally positioned between inside edge 206 of disc-facing surface 203 and the inside edges of rail 227, cavity dam 232 and leading-inside surface component 222. Recessed surface 268 generally extends from leading edge 210 of disc-facing surface 203 to trailing edge 212. Recessed surface 272 is generally defined on one side by the outside edges of rail 229, cavity dam 232 and leading-inside surface component 222. The other side of recessed surface 272 is generally defined by the inside edges of the center set 218 of surface components. Recessed surface 272 generally extends between leading edge 210 of disc-facing surface 203 and trailing edge 212. Recessed surface 270 is generally angled in a line that is generally parallel with trailing edge 256 of surface component 222 and leading edge 244 of cavity dam leading surface 242. Recessed surface 270 extends between recessed surface 272 and recessed surface 268.

In accordance with one embodiment, the depths of recessed surfaces 266, 268, 270 and 272 are generally greater or deeper than the depths of the other disc-facing surface 203 surface components. In accordance with one embodiment, recessed surfaces 266, 268, 270 and 272 have the same depth and are co-planar and contiguous with one another. In accordance with another embodiment, each of the individual recessed surfaces 266, 268, 270 and 272 need not have the exact same depth, however, the depth of each of the recessed surfaces is generally greater than the other surface components of disc-facing surface 203.

Recessed surfaces 266, 268, 270 and 272 are generally displaced in-depth from and have a larger and deeper depth than cavity floor 252 of cavity 250. In other words, the depth of recessed surfaces 266, 268, 270 and 272 is generally greater or deeper than the depth of cavity floor 252. In accordance with one embodiment, the cavity floor 252 of sub-ambient pressure cavity 250 has a depth of approximately 2–3 microns while each recessed surface 266, 268, 270 and 272 has a depth of approximately 10 microns, as measured from a plane that is generally co-planar with at least one of the described bearing surfaces associated with cavity dam 232, rail 227 or surface component 222. In accordance with one illustrative embodiment, cavity floor 252 has a depth that is greater or deeper than the depth of rail surfaces 224, 226 and 228, cavity dam surfaces 234 and 242, and surface 262 of surface component 222, but less than or shallower than the depth of the recessed surfaces 266, 268, 270 and 272.

FIG. 5 is a schematic cross-sectional view taken along line 5—5 in FIG. 4. FIG. 5 depicts and clarifies illustrative surface depth relationships. As is illustrated, recessed surface 268 has a depth 274 as measured from a bearing surface plane 276 that is generally co-planar with rail bearing surface 226. In comparison, cavity floor 252 has a depth 278 as measured from the bearing surface plane 276.

In accordance with one embodiment, depth 274 is generally greater than depth 278. In accordance with another embodiment, depth 274 is at least twice as depth 278. In accordance with another embodiment, depth 274 has a value that is at least 6 microns, preferably at or between 8 and 10 microns. Depth 274 values greater than 10 microns should also be considered as within the scope of the present invention and might be more effective for the functionality contemplated and described below. Such depths, however, are difficult to achieve due to present manufacturing constraints. In accordance with one embodiment, depth 278 has a value at or between 1 and 6 microns, preferably at or between 2 and 3 microns. Illustratively, in terms of depth, recessed surfaces 266, 270 and 272 are similar to or the same as recessed surface 268.

FIG. 6 is a plan view of slider 200, wherein to emphasize the center set 218 of surface components, surface components 220 and 222, as well as surface component sets 214 and 216, are not shown. The center set 218 of surface components includes a center cavity dam 602, center rails 604 and 606, a center sub-ambient pressure cavity 608, a center trailing pad 618 and transducer support surface components 628. Center sub-ambient pressure cavity 608 includes a cavity floor 610.

Center cavity dam 602 includes a surface 612. Center cavity dam 602 also includes a leading surface 638 (illustratively, but not necessarily a bearing surface) and a leading step surface 644. Step surface 644 is displaced from (deeper than) surface 638 and displaced from the bearing surface plane. Center rails 604 and 606 include surfaces 614 and 616 respectively. In accordance with one embodiment, surfaces 614 and 616 are bearing surfaces.

Center cavity dam 602 illustratively, although not necessarily, abuts center rails 604 and 606, and engages leading edge 210 of disc-facing surface 203. Center cavity dam 602, rail 604 and rail 606 generally form outer perimeter boundaries of center sub-ambient pressure cavity 608. On the trailing end of center sub-ambient pressure cavity 608, an additional boundary is formed by center trailing pad 618. Center trailing pad 618 includes a step surface 620 and a bearing surface 622. Illustratively, center trailing pad 618 has a tapered width. For example, the width of center trailing pad 618 is illustratively tapered from a narrow width 624 on its leading side to a broader width 626 at or near its trailing side.

It should be noted that the illustrated shape and surface configurations of center trailing pad 618 are not critical to the present invention. Other center pad shapes and surface configurations that present other pressure patterns could be utilized. Different pressure patterns might be desirable depending on the nature of a given slider application and/or slider environment. The specifically illustrated and described center pad shapes and surface configurations, as well as other center pad shapes and surface configurations should be considered within the scope of the present invention.

As is illustrated, a transducer 636 is positioned proximate center trailing pad 618 and is supported by surface components 628, which are positioned proximate trailing edge 212. Surface components 628 illustratively include a recessed surface 630 and a transducer-support surface 632 that, in combination, accommodate and support transducer 636 in a position that is illustratively appropriate for the read/write operations of slider 200 in a disc drive environment.

In accordance with one embodiment, surface 632 has substantially the same depth as at least one of the bearing surfaces associated with slider 200. Due to manufacturing variations, however, surface 632 could be slightly deeper than the bearing surface. In accordance with one embodiment, surface 630 is displaced in depth from (deeper than) surface 632 and illustratively has substantially the same depth as one of the cavity floors associated with slider 200. Due to manufacturing variations, however, surface 630 could be slightly deeper than the cavity floor.

The illustrated transducer support configuration as well as other transducer support configurations should be considered within the scope of the present invention. In other words, surface components 628 are intended to be exemplary only. The precise illustrated location of the transducer (e.g., in a centered location proximate trailing edge 212) also is not critical to the present invention. Other transducer positions and surface support configurations may be preferable depending on a given slider application and/or slider environment and are within the scope of the present invention.

As will be described below, cavity floor 610 illustratively has approximately the same depth as cavity floor 252 (e.g., depth 278 in FIG. 5). The depth of recessed surface 630 is illustratively shallower or smaller than the depth of the above-described other recessed surfaces (surfaces 266, 268, 270 and 272 in FIG. 4).

In accordance with one embodiment, center cavity dam surface 612, center rail surfaces 614 and 616, center pad surface 622 and center leading surface 638 have a smaller or shallower depth than center cavity floor 610, than center pad surface 620 and than center leading step surface 644. In accordance with one specific embodiment, center cavity dam surface 612, center rail surfaces 614 and 616, center pad surface 622 and center leading surface 638 are all bearing surfaces (0 depth) and the other surfaces of the center set 218 of surface components are displaced therefrom (e.g., they have a greater depth). Other depth relationships between the different surfaces of the slider embodiments described herein should be considered within the scope of the present invention.

In accordance with one embodiment, cavity floor 610 has a depth that is the same or substantially similar to the depth of cavity floor 252 (e.g., depth 278 in FIG. 5). The center pad surface 620 and the center leading step surface 644 illustratively have the same depth, a depth that is shallower or less than the depth of cavity floor 610. In accordance with one embodiment, the depth of center pad step surface 620 and the center leading step surface 644 is the same as the depth of cavity dam leading surface 242 and/or rail step surfaces 224 and 228 (FIG. 4). The relative depths of the different surfaces described herein should be considered examples only. Other depth relationships between the different surfaces of the slider embodiments described herein should be considered within the scope of the present invention.

FIG. 7 is a schematic cross-sectional view taken along line 7—7 in FIG. 6. FIG. 7 depicts and clarifies illustrative surface depth relationships. As is illustrated, recessed surfaces 268 are located on the inside and outside of the center set 218 of surface components. Recessed surfaces 268 have a depth 274, as measured from a bearing surface plane 276 that is generally co-planar with center rail bearing surfaces 614 and 616. In comparison, cavity floor 610 has a depth 278 as measured from the bearing surface plane 276.

In accordance with one embodiment, depth 274 is generally greater than depth 278. In accordance with another embodiment, depth 274 is at least twice as depth 278. In accordance with another embodiment, depth 274 has a value that is at least 6 microns, preferably at or between 8 and 10 microns. Depth 274 values greater than 10 microns should also be considered as within the scope of the present invention and might be more effective for the functionality contemplated and described below. Such depths, however, are difficult to achieve due to present manufacturing constraints. In accordance with one embodiment, depth 278 has a value at or between 1 and 6 microns, preferably at or between 2 and 3 microns.

As is indicated in FIGS. 6 and 7, with the exception of center pad 618 surfaces and the transducer supporting surface components 628, the center set of surface components 218 have a width 624. Width 624 is illustratively the width of cavity dam 602. As was described above, the inside set 214 of surface components have a width 264 (indicated in FIG. 4). Width 264 is generally larger than width 624. In accordance with one embodiment, width 264 is at least twice as large as width 624. In accordance with another embodiment, width 264 is at least three times as large as width 624.

In accordance with one aspect of the present invention, slider 200 is designed to be particularly insensitive to contamination particles encountered during the operation of slider 200 within a disc drive environment. In particular, slider 200 is designed to utilize particle flushing channels, defined by the above-described recessed surfaces, to discourage the accumulation of contamination particles at or near the trailing edge bearing surface (at or near center trailing pad 618) of slider 200, typically the transducer region of the slider. The configuration of this specialized disc-facing surface illustratively causes the mass flow pattern under slider 200 during operation to be manipulated so as to prevent particles from accumulating around transducer 636. FIG. 8 is a schematic diagram 660 and depicts illustrative mass flow lines for an operating slider 200 and shows how contamination particles are illustratively diverted through flushing channels away from center trailing pad 618.

Generally speaking, during operation of slider 200, an actuator arm (e.g., arm 144 in FIG. 1) will move the slider such that the slider will experience fluid flow (e.g., air flow) from a variety of angles, commonly known as skew angles. At low skew angle placement of the actuator arm, slider 200 will generally experience fluid flow (e.g., air flow) from the direction of leading edge 210.

Accordingly, at low skew angles, contamination particles will primarily enter the head disc interface (HDI) from the leading edge 210 of slider 200. The disc-facing surface 203 configuration of surface components illustratively manipulates the operational fluid flow (e.g., air flow) and channels contamination particles that enter from the direction of leading edge 210 away from or past the transducer region of the slider (see FIG. 8). Inside and outside leading surface components 220 and 222 also enable a "plowing" out of the way of loose particles on the disc surface.

At high skew angle placement of the actuator arm, slider 200 will generally experience fluid flow (e.g., air flow) either from the direction of inside edge 206 or outside edge 208. Accordingly, at high skew angles, contamination particles will primarily enter the head disc interface (HDI) from the sides of the slider. Placement of some kind of bearing surface proximate inside edge 206 and/or outside edge 208 might prevent entrance of contamination particles from the side edges. Unfortunately, processing constraints make it generally difficult to place active bearing surfaces close to the sides of the slider. In accordance with one aspect of the present invention, the disc-facing surface 203 configuration of surface components manipulates the operational fluid flow (e.g., air flow) and channels contamination particles that enter from the sides of the slider away from or past the transducer region of the slider (see FIG. 8).

In accordance with another aspect of the present invention, slider 200 is designed to provide beneficial flight performance characteristics during operation within a disc drive environment. For example, the multiple sub-ambient pressure cavities of disc-facing surface 203 encourage a steady state position of slider 200 relative to a disc during operation, thereby enabling better slider attitude control, namely, slider fly height, pitch and/or roll, and therefore an improved read/write consistency. The features of slider 200 also encourage some degree of intrinsic stiffness which discourages undesirable variations (e.g., pitch and roll variations) during the operation of slider 200. Depending on a particular slider application and/or environment, the features of slider 200 may provide other operational performance benefits.

Slider 200 is but one illustrative example of many potential embodiments of the present invention. General concepts of the present invention could be applied to generate other configurations that are also embodiments within the scope of the present invention. The most appropriate configuration is application-specific and depends at least on the particular environmental considerations associated with a given slider application. Several additional illustrative embodiments are discussed below in relation to FIGS. 9–13.

FIG. 9 is a plan view of a slider 900 in accordance with another illustrative embodiment of the present invention. Within FIG. 9, elements that are the same or substantially similar to elements described in relation to slider 200 (FIGS. 2–8) are similarly or identically labeled. Slider 900 is illustratively designed to operate in a manner similar to the operation of slider 110 described in relation to FIG. 1.

Slider 900 is formed of a substrate having a slider body 902 that includes a slider disc-facing surface 903. Slider disc-facing surface 903 includes an inside edge 906 and an outside edge 908, a leading edge 910 and a trailing edge 912. Disc-facing surface 903 also includes a variety of features disposed between those edges.

With a few exceptions that will be pointed out below, slider 900 is similar to slider 200 in terms of the inclusion and placement of various specific surfaces located between the disc-facing surface edges. While the depths of the various specific surfaces located on slider disc-facing surface 903 are illustratively the same or similar to their disc-facing surface 203 counterparts, the shape of the various specific surfaces located on disc-facing surface 903 are substantially different than their disc-facing surface 203 counterparts. For example, while disc-facing surface 203 is symmetrically formed with surface components on one side being the mirror image of surface components on the other side, disc-facing surface 903 of slider 900 is not so symmetrically formed. Other differences in shape will be pointed out in more detail below.

Disc-facing surface 903 includes an inside set 914 of surface components that is similar to the inside set 214 of surface components. Set 914 of surface components, however, includes a couple of specific features that are shaped quite differently than their set 214 counterparts. Set 914 includes an inside cavity dam 932 that is shaped differently than inside cavity dam 232. For example, inside cavity dam 932 includes an extension portion 980. Disc-facing surface 903 also includes an inside sub-ambient pressure cavity 950 having a cavity floor 952 that is shaped differently than cavity floor 252. Cavity floor 952 extends all the way to trailing edge 912 of disc-facing surface 903 and includes an angled portion 982 and a portion 984 that is positioned proximate trailing end 925 of rail 927.

Outside set 916 of surface components also includes features that are shaped differently than the features included in outside set 216 of surface components. Outside set 916, like inside set 914, includes a sub-ambient pressure cavity that extends to trailing edge 912 of disc-facing surface 903. A portion of the outside cavity floor is also positioned proximate the trailing end of an outside rail 986. Rail 986 is generally straight rather than having any angled portion. Outside set 916 also includes an outside cavity dam 988 having a shape that is different than the shape of the cavity dams of disc-facing surface 203, and different than the shape of cavity dam 932.

The center set of surface components 918 is shaped differently than the center set 218 of surface components (FIG. 6). Most notably, the center set 918 of surface components does not extend to leading edge 910 of disc-facing surface 903. Instead, a leading end 990 of center cavity dam 905 terminates so as to be displaced from leading edge 910. Center pad 992 has a bearing surface and a step surface similar to center pad 618 (FIG. 6) of disc-facing surface 203, but is shaped to accommodate the extended cavity floor surfaces of sets 914 and 916 of surface components.

While disc-facing surface 203 includes surface components 220 and 222, disc-facing surface 903 instead includes a single surface component 994. Surface component 994 illustratively has a straight leading edge 996 that is generally disposed proximate to and illustratively co-planar with leading edge 910. Surface component 994 further includes an angled trailing edge 997 that is generally angled from a center point 998 to two corner points 999. Trailing edge 997 is illustratively angled to accommodate and to be generally in parallel alignment with leading surface edges 944, which are similar to leading surface edges 244 in the context of disc-facing surface 203. Surface component 994 is illustratively configured to "plow" away contamination particles during operation of slider 900.

Disc-facing surface 903 includes a plurality of recessed surfaces that generally separate and divide surface component 994 and surface component sets 914, 916 and 918 from one another. Specifically, disc-facing surface 903 includes an inside-edge recessed surface 968, an inside-leading recessed surface 970 and an inside center recessed surface 972. Similar recessed surfaces are illustratively included on the outside side of disc-facing surface 903 and similarly are configured around outside set 916 of surface components. As a result of the cavity floors (e.g., cavity floor 952) that extend to the trailing edge 912, disc-facing surface 903 does not include an inside-trailing recessed surface.

Disc-facing surface 903 of slider 900 is therefore configured similar to disc-facing surface 203 of slider 200, but includes a slightly different arrangement of surfaces and surface shapes. The depths of the various surface features and components of disc-facing surface 903 are illustratively the same or similar to the depths of their counterpart surfaces described in the context of slider 200. Slider 900 is but another illustrative example of many potential embodiments of the present invention. The most appropriate configuration of surface components is application-specific and depends at least on the particular environmental considerations associated with a given slider application.

FIG. 10 is plan view of a slider 1000 in accordance with another illustrative embodiment of the present invention. Within FIG. 10, elements that are the same or substantially similar to elements described in relation to slider 200 (FIGS. 2–8) are similarly or identically labeled. Slider 1000 is illustratively designed to operate in a manner similar to the operation of slider 110 described in relation to FIG. 1.

Slider 1000 is formed of a substrate having a slider body 1002 that includes a slider disc-facing surface 1003. Slider disc-facing surface 1003 includes an inside edge 1006 and an outside edge 1008, a leading edge 1010 and a trailing edge 1012. Disc-facing surface 1003 also includes a variety of features disposed between those edges.

Disc-facing surface 1003 is notably different from disc-facing surface 203 in that it does not include surface components 220 or 222. Disc-facing surface 1003 does include an inside set 1014 of surface components. Also included, is an outside set 1016 of surface components that is illustratively the mirror image equivalent of the inside set 1014 components. To simplify description, primary description will be directed only to the inside set 1014 of surface components under the assumption that the outside set 1016 of surface components is substantially the same but a reversed mirror image equivalent.

The inside set 1014 of surface components includes an inside rail 1027 and an outside rail 1029. Inside rail 1027 is configured similar to inside rail 227 (FIG. 4) in that it includes a rail step surface 1024 and a rail bearing surface 1026. Outside rail 1029 includes a rail step surface 1028. In terms of depth, rails 1027 and 1029 are illustratively configured similar to rails 227 and 229 described above in relation to FIG. 4. Rail 1027 is illustratively shaped different than rail 227 but operates in generally the same manner.

The inside set 1014 of surface components also includes a cavity dam 1032 that illustratively, although not necessarily, abuts rails 1027 and 1029. Cavity dam 1032 has a cavity dam upper surface 1034 that illustratively, although not necessarily, forms a bearing surface. Cavity dam 1032 also includes a cavity dam upper surface leading edge 1036 that is generally angled from a leading edge inside corner point 1038 to a leading edge outside corner point 1040. Point 1038 is generally further displaced from leading edge 1010 of disc-facing surface 1003 than point 1040. Cavity dam 1032 also includes a cavity dam leading surface 1042. Cavity dam leading surface 1042 has a leading surface edge 1044 that is generally angled from a leading edge inside corner point 1046 to a leading edge outside corner point 1048. Point 1046 is generally further displaced from leading edge 1010 than point 1046. Point 1048 illustratively is situated proximate to leading edge 1010. In terms of depth, cavity dam 1032 is generally configured similar to cavity dam 232 described in relation to slider 200 (FIGS. 2–8).

Inside set 1014 of surface components further includes a sub-ambient pressure cavity 1050 having a cavity floor 1052. Generally speaking, the cavity 1050 and cavity floor 1052 are configured similar to sub-ambient pressure cavity 250 and cavity floor 252 described in relation to slider 200 (FIGS. 2–8).

Disc-facing surface 1003 further includes a center set 1018 of surface components. Center set 1018 of surface components is substantially similar to center set 218 of slider 200 (FIGS. 2–8). The primary difference between the two sets of surface components is that center set 1018 does not include a recess portion near its leading end.

Disc-facing surface 1003 further includes a plurality of recessed surfaces that generally separate and divide surface component sets 1014, 1018 and 1016 from one another. Disc-facing surface 1003 includes an inside-trailing recessed surface 1066, an inside-edge recessed surface 1068, an inside-leading recessed surface 1070 and an inside-center recessed surface 1072. In combination, the recessed surfaces 1066, 1068, 1070 and 1072 generally surround the inside set 1014 of surface components. A similar set (mirror image reversed equivalent set) of recessed surfaces illustratively generally surround the outside set 1016 of surface components. For the sake of simplicity, only the recessed surfaces that surround 1014 of surface components will be described in detail.

Recessed surface 1066 is generally positioned between trailing edge 1012 of disc-facing surface 1003 and rail/cavity trailing ends 1023, 1025 and 1051. Recessed surface 1066 generally extends between recessed surface 1068 and recessed surface 1072. Recessed surface 1068 is generally positioned between inside edge 1006 of disc-facing surface 1003 and the inside edges of inside rail 1027 and cavity dam 1032. Recessed surface 1068 generally extends from leading edge 1010 of disc-facing surface 1003 to trailing edge 1012. Recessed surface 1072 is generally positioned between the outside edges of rail 1029, cavity dam 1032, and the inside edges of the center set 1018 of surface components. Recessed surface 1072 generally extends between leading edge 1010 of disc-facing surface 1003 and trailing edge 1012. Recessed surface 1070 generally extends between leading edge corner point 1048 and recessed surface 1068 and between leading edge 1010 of disc-facing surface 1003 and leading edge 1044 of surface 1042.

Slider 1000 is another illustrative example of many potential embodiments of the present invention. The most appropriate configuration is application-specific and depends at least on the particular environmental considerations associated with a given slider application.

FIG. 11 is a plan view of a slider 1100 in accordance with another illustrative embodiment of the present invention. Within FIG. 11, elements that are the same or substantially similar to elements described in relation to slider 200 (FIGS. 2–8) are similarly or identically labeled. Slider 1100 is illustratively designed to operate in a manner similar to the operation of slider 110 described in relation to FIG. 1.

Slider 1100 is formed of a substrate having a slider body 1102 that includes a slider disc-facing surface 1103. Slider disc-facing surface 1103 includes an inside edge 1106 and an outside edge 1108, a leading edge 1110 and a trailing edge 1112. Disc-facing surface 1103 also includes a variety of features disposed between those edges.

Disc-facing surface 1103 is similar to disc-facing surface 1003 (FIG. 10) in that it does not include surface components 220 or 222, which are included on disc-facing surface 203 (FIGS. 2–8). Disc-facing surface 1103 includes an inside set 1114 of surface components. Also included is an outside set 1116 of surface components that is illustratively the mirror image equivalent of the inside set 1114 of surface components. In order to simplify description, specific description will be directed primarily to the inside set 1114 of surface components under the assumption that the outside set 1116 of surface components is substantially the same but a reversed mirror image equivalent.

The inside set 1114 of surface components includes an inside rail 1127 and an outside rail 1129. Inside rail 1127 includes a rail step surface 1124 and a rail bearing surface 1126. Outside rail 1129 includes a rail step surface 1128. In terms of depth, rails 1127 and 1129 are illustratively configured similar to rails 227 and 229 described about in relation to FIG. 4. Rail 1127 is illustratively shaped different than rail 227 but operates in generally the same manner.

The inside set 1114 of surface components also includes a cavity dam 1132 that illustratively, although not necessarily, abuts rails 1127 and 1129. Cavity dam 1132 has a cavity dam upper surface 1134 that illustratively, although not necessarily, forms a bearing surface. Cavity dam 1132 also includes a cavity dam upper surface leading edge 1136 that is generally angled from a leading edge inside corner point 1138 to a leading edge outside corner point 1140. Point 1140 is generally further displaced from leading edge 1110 of disc-facing surface 1103 than point 1140. Cavity dam 1132 also includes a cavity dam leading surface 1142. Cavity dam leading surface 1142 has a leading surface edge 1144 that is generally angled from a leading edge inside corner point 1146 to a leading edge outside corner point 1148. Point 1148 is generally further displaced from leading edge 1110 of disc-facing surface 1103 than point 1146. Point 1146 illustratively is situated proximate the leading edge 1110. In terms of depth, cavity dam 1132 is generally configured similar to cavity dam 232 described in relation to slider 200 (FIGS. 2–8).

Inside set 1114 of surface components further includes a sub-ambient pressure cavity 1150 having a cavity floor 1152. Generally speaking, the cavity 1150 in cavity floor 1152 are configured similar to sub-ambient pressure cavity 250 and cavity floor 252 described in relation to slider 200 (FIGS. 2–8).

Disc-facing surface 1103 further includes a center set 1118 of surface components. Center set 1118 of surface components is substantially similar to center set 1018 of slider 1000 described in relation to FIG. 10. The primary different between the two sets of surface components is that center set 1118 has a differently shaped center cavity dam 1180. Center cavity dam 1180 has a cavity dam upper surface 1182 that illustratively, although not necessarily, forms a bearing surface. Cavity dam 1182 also includes a cavity dam upper surface leading edge 1184 that is generally angled from a center point 1186 to two side corner points 1188. Points 1188 are generally further displaced from leading edge 1110 of disc-facing surface 1103 than point 1186. Center cavity dam 1180 also includes a cavity dam leading surface 1190. Cavity dam leading surface 1190 has a leading surface edge 1192 that is generally angled from a center point 1194 to two side corner points 1194. Points 1194 are generally further displaced from leading edge 1110 of disc-facing surface 1103 than point 1194. Point 1194 illustratively is situated proximate leading edge 1110. Center cavity dam leading surface 1190 is illustratively displaced in depth from center cavity dam upper surface 1182. In other words, center cavity dam leading surface 1190 illustratively has a greater or deeper depth than center cavity dam upper surface 1182.

Disc-facing surface 1103 further includes a plurality of recessed surfaces that generally separate and divide surface component sets 1114, 1118 and 1116 from one another. Disc-facing surface 1103 includes an inside-trailing recessed surface 1166, an inside-edge recessed surface 1168, an inside-leading recessed surface 1170 and an inside-center recessed surface 1172. In combination, the recessed surfaces 1166, 1168 1170 and 1172 generally surround the inside set 1114 of surface components. A similar set (mirror image reverse equivalent set) of recessed surfaces illustratively generally surround the outside set 1116 of surface components. For the sake of simplicity, only the recessed surfaces that surround 1114 of surface components will be described in detail.

Recessed surface 1166 is generally positioned between trailing edge 1112 of disc-facing surface 1103 and rail/cavity trailing ends 1123, 1125 and 1151. Recessed surface 1166 generally extends between recessed surface 1168 and recessed surface 1172. Recessed surface 1168 is generally positioned between inside edge 1106 of disc-facing surface 1103 and the inside edges of inside rail 1127 and cavity dam 1132. Recessed surface 1168 illustratively extends from leading edge 1110 of disc-facing surface 1103 to trailing edge 1112. Recessed surface 1172 is generally positioned between the outside edges of rail 1129, cavity dam 1132, and the inside edges of the center set 1118 of surface components. Recessed surface 1172 generally extends between point 1194 of center cavity dam 1180 and trailing edge 1112 (follows around trailing center pad . . . this is also true for similar previously described embodiments). Recessed surface 1170 generally extends between leading edge corner point 1146 and recessed surface 1172 and between leading edge 1110 of disc-facing surface 1103 and leading edge 1144 of surface 1142.

Slider 1100 is another illustrative example of many potential embodiments of the present invention. The most appropriate configuration is application-specific and depends at least on the particular environmental considerations associated with a given slider application.

FIG. 12 is a plan view of a slider 1200 in accordance with another illustrative embodiment of the present invention. Within FIG. 12, elements that are the same or substantially similar to elements described in relation to slider 200 (FIGS. 2–8) are similarly or identically labeled. Slider 1200 is illustratively designed to operate in a manner similar to the operation of slider 110 described in relation to FIG. 1.

Slider 1200 is formed of a substrate having a slider body 1202 that includes a slider disc-facing surface 1203. Slider disc-facing surface 1203 includes an inside edge 1206 and an outside edge 1208, a leading edge 1210 and a trailing edge 1212. Disc-facing surface 1203 also includes a variety of features disposed between those edges. For example, disc-facing surface 1203 includes an inside set 1214 of surface components. Also included, is an outside set 1216 of surface components and a center set 1218 of surface components.

The inside sets 1214 and 1216 of surface components each include a cavity dam 1232. Cavity dams 1232 includes upper surfaces 1234 and leading recessed surfaces 1242. Upper surfaces 1234 are illustratively bearing surfaces. Leading recessed surfaces 1242 are illustratively displaced in depth from (have a greater depth than) upper surfaces 1234. Leading surfaces 1242 includes angled leading edges 1244.

The leading edge 1244 of the leading surface 1242 that is closest to edge 1206 of disc-facing surface 1203 is illustratively angled from an inside corner point 1246 to an outside corner point 1248. Point 1246 is generally further displaced from leading edge 1210 of disc-facing surface 1203 than point 1248. Point 1248 is illustratively positioned proximate to leading edge 1210. Point 1246 is illustratively also a corner point of a leading edge 1236 of upper surface 1234 that is angled (as illustrated) or straight (not shown). The leading edge 1244 of the leading surface 1242 that is closest to edge 1208 is similar but reversed in configuration (mirror image equivalent reversal).

The sets 1214 and 1216 of surface components each include rail recessed surfaces 1224 and 1228. Each set also includes a cavity-level surface 1223. Each set also includes a plurality of rail bearing surfaces 1226 that generally surround, except for the areas of recessed surfaces 1228, rail recessed surfaces 1224 and cavity-level surfaces 1223.

Of the various surfaces comprised by sets 1214 and 1216 of surface components, surfaces 1223 illustratively have the deepest depth. Surfaces 1224 and 1228 have the next deepest depth. In accordance with one embodiment, surfaces 1242 and 1224 have the same depth. In accordance with one embodiment, surfaces 1234 and 1226 are bearing surfaces and therefore have the shallowest depths.

Center set 1218 of surface components is illustratively configured in a manner substantially similar to center set 1118 of surface components described in the context of slider 1100 in relation to FIG. 11. Center set 1218 of surface components, however, has a substantially larger width than the previously described center sets of surface components. In the context of previously described center sets, the width of the center set of surface components is generally less wide than the width of the inside and outside sets of surface components. In the instance of slider 1200, however, the width relationship is just the opposite. For example, the center set 1218 of surface components illustratively has a width 1280. The inside set 1214 and outside set 1216 of surface components illustratively have a width 1282. Width 1280 is greater than width 1282. In accordance with one embodiment, width 1280 is at least twice as wide as width 1282. In accordance with one embodiment, width 1280 is at least three times as wide as width 1282. The width of center set 1218 is generally wider than previously described center sets and the widths of inside and outside sets 1214 and 1216 is generally narrower than previously described inside and outside sets.

As is indicated by FIG. 12, not all of the various features of center set 1218 need be widened to accommodate the overall extended width of the center set 1218 of surface components. As illustrated, the cavity dam is widened to width 1280, the rails are widened to width 1280 and the sub-ambient pressure cavity is significantly widened. The center pad and transducer-supporting surfaces, however, are illustratively left the same general size and in the same general position. The cavity floor of center sub-ambient pressure cavity is illustratively extended around the center pad and transducer-supporting surface components to trailing edge 1212. As is illustrated, the center cavity dam has an angled leading portion that is similar to (but wider than) the angled leading portion of slider 1100 (FIG. 11).

Center set 1218 of surface components illustratively includes a sub-ambient pressure cavity 1284 having a cavity floor 1286. Also included are rail bearing surfaces 1288 and rail step surfaces 1290. Cavity floor 1286 illustratively has a deeper depth than the other center set 1218 surface components. In accordance with one embodiment, cavity floor 1286 has the same depth as surfaces 1223. Surfaces 1290 are illustratively displaced in depth from the bearing surfaces. In accordance with one embodiment, surfaces 1290 have the same depth as surfaces 1224. In accordance with one embodiment, the leading recessed surfaces of the center, inside and outside cavity dams have the same depth as surfaces 1290.

Disc-facing surface 1203 includes a plurality of recessed surfaces that generally separate and divide surface components sets 1214, 1216 and 1218 from one another. Disc-facing surface 1203 includes an inside-trailing recessed surface 1266, an inside-edge recessed surface 1268 and an inside-center recessed center 1272. In combination, the recessed surfaces 1266, 1268 and 1272 generally surround the inside set 1214 of surface components. It should be pointed out that recessed surfaces 1266, 1268 and 1272 have a depth that is generally deeper than the cavity floors associated with the slider (e.g., they have a depth that is relatively similar to the above-described depth of surfaces 266, 268, 270 and 272 in FIG. 4). A similar set of recessed surfaces illustratively surrounds the outside set 1216 of surface components.

FIG. 13 is a plan view of a slider 1300 in accordance with another illustrative embodiment of the present invention. Slider 1300 is illustratively designed to operate in a manner similar to the operation of slider 110 described in relation to FIG. 1. Slider 1300 is illustratively substantially similar to slider 1200 (FIG. 12), except that the cavity dam leading surfaces 1342 have leading edges 1344 that are angled in the opposite directions as they were in the context of FIG. 12. Leading edges 1236 are also oppositely angled.

Sliders 1200 and 1300 are additional illustrative examples of many potential embodiments of the present invention. The most appropriate configuration is application-specific and depends at least on the particular environmental considerations associated with a given slider application.

Several of the above-described disc head slider embodiments of the present invention generally include disc-facing surfaces having three "sets" of surface components that are generally separated from one another by recessed surfaces that are recessed below cavity floor depth. In accordance with another embodiment of the present invention, a disc-facing surface includes more than three (e.g., 5 or more) sets of surface components that are generally separated from one another by similar recessed surfaces.

In accordance with one example of this latter embodiment, a disc head slider includes a disc-facing surface having a center set of surface components, two inside sets of surface components and two outside sets of surface components. The center set of surface components includes a center cavity dam and a center sub-ambient pressure cavity having a center cavity floor. The two inside sets of surface components each include an inside cavity dam and an inside sub-ambient pressure cavity having an inside cavity floor. The two outside sets of surface components each include an outside cavity dam and an outside sub-ambient pressure cavity having an outside cavity floor. The center set of surface components is generally disposed between the two inside sets of surface components and the two outside sets of surface components. All five sets of surface components are separate and disassociated from one another. In accordance with one embodiment, all five sets are separated from one another by recessed surfaces similar to those described above in relation to other embodiments.

FIG. 14, in accordance with another illustrative embodiment of the present invention, is a plan view of a slider 1400 as viewed from the surface of a disc, e.g., disc 107 in FIG. 1. Slider 1400 is illustratively designed to operate in a manner similar to the operation of slider 110 described in relation to FIG. 1.

Slider 1400 is formed of a substrate having a slider body 1402 that includes a disc-facing surface 1403. Disc-facing surface 1403 includes an inside edge 1406, an outside edge 1408, a leading edge 1410 and a trailing edge 1412. Disc-facing surface 1403 also includes a variety of features disposed between those edges. For example, disc-facing surface 1403 includes an inside rail 1414, an outside rail 1416, a cavity dam 1430, a sub-ambient pressure cavity 1442, and a center pad 1445.

At least one and potentially several of the disc-facing surface 1403 features illustratively includes a bearing surface. Generally speaking, when slider 1400 is positioned relative a disc (e.g., disc 107 in FIG. 1) the bearing surface or surfaces will generally be positioned closer to the disc than other surfaces. Illustratively, the bearing surfaces are generally in a plane that, for the purpose of the present description, will be referred to as the bearing surface plane. In accordance with one embodiment, slider 1400 includes multiple bearing surfaces that are generally coplanar within the bearing surface plane and are therefore positioned approximately the same distance from the disc (e.g., disc 107). The surfaces and planes described herein may actually reflect slider crown and cross curvature, rather than being disposed in a perfectly flat plane.

In accordance with one embodiment, cavity dam 1430 comprises a step surface 1431. Also, inside rail 1414 and outside rail 1416 each include a bearing surface 1415. Generally speaking, step surface 1431 is offset in depth from bearing surfaces 1415. In other words, bearing surfaces 1415 extend further towards the disc (e.g., disc 107 in FIG. 1) than does step surface 1431. Step surface 1431 has a deeper or greater depth than bearing surfaces 1415 (e.g., because surfaces 1415 are bearing surfaces, they illustratively have a depth value of zero). As is illustrated, rails 1414 and 1416 each include portions that generally extend into cavity dam 1430.

The specific rail and dam shapes illustrated and described herein should be considered only illustrative examples of many potential shapes within the scope of the present invention. For example, without departing from the scope of the present invention, rails 1414 and 1416 could generally abut cavity dam 1430 rather than extend into it. Also, without departing from the scope of the present invention, any of rail 1414, rail 1416 and cavity dam 1430 could have surface depths other than illustrated or could have multiple surfaces with any of a variety of surface depth combinations.

Sub-ambient pressure cavity 1442 is generally positioned between inside rail 1414, outside rail 1416 and cavity dam 1430. Sub-ambient pressure cavity 1442 includes a cavity floor 1443. Generally speaking, cavity floor 1443 is deeper than the other surfaces of disc-facing surface 1403. Cavity floor 1443 is generally deeper and further disposed from the bearing surface plane than at least surfaces 1415, 1431, 1446 and 1448, several of which will be described in more detail below.

Center pad 1445 is illustratively, although not necessarily, positioned proximate trailing edge 1412 in a location that is generally centered along that edge. Center pad 1445 includes a center step surface 1446 and a center bearing surface 1448. Generally speaking, center step surface 1446 is offset in depth from center bearing surface 1448. In other words, center bearing surface 1448 extends further towards the disc (e.g., disc 107 in FIG. 1) than does center step surface 1446. Surface 1446 has a greater or deeper depth than surface 1448 (e.g., because surface 1448 is a bearing surface, it illustratively has a depth value of zero). The depth of center step surface 1446 illustratively may be the same or different than the depth of surface 1431.

A channel 1449 generally divides center step bearing surface 1448 into three separate and generally unconnected surfaces, namely, a first leading surface 1450, a second leading surface 1451 and a trailing surface 1452. A transducer 1453 is illustratively positioned between trailing surface 1452 and trailing edge 1412 of slider 1400. Channel 1449 is illustratively configured to discourage the accumulation of loose particles in the transducer region of the slider.

FIG. 15 is a schematic diagram of slider 1400 and illustrates how, during operation of slider 1400 within a disc drive environment, particles are diverted by channel 1449 away from transducer 1453. During disc drive operation, mass flow (e.g., airflow) and particles illustratively move towards transducer 1453 along the paths indicated by arrow 1502, as well as along other similar paths. Mass flow (e.g., airflow) and particles are then deflected by channel 1449 along the paths indicated by arrows 1504. Leading surfaces 1450 and 1451 illustratively, although not necessarily, include a rounded or tapered leading edge to divert mass flow (e.g., airflow) and particles around and past transducer 1453. Such leading edges are especially effective for mass flow and particles that are not directly intercepted by channel 1449. Despite the sensitive location of channel 1449 relative transducer 1453, high pressure is maintained in the vicinity of the transducer to enable bearing surface 1448 to function adequately in that regard.

Channel 1449 illustratively is formed by walls that generally extend from and are associated with leading surfaces 1450 and 1451, as well as with trailing surface 1452. Also, channel 1449 includes a channel floor 1457. In accordance with one embodiment, channel floor 1457 is generally contiguous and coplanar with center step surface 1446. In accordance with another embodiment, channel floor 1457 has the same depth as cavity floor 1443. Channel floor 1457 could, without departing from the scope of the present invention, have other depths than those specifically described herein.

Generally speaking, transducer 1453 is positioned between channel 1449 and trailing edge 1412 of slider 1400. Channel 1449 illustratively has a "Y" shape formed by first and second angled channel portion 1459 that intersect one another at an intersection point 1461. At intersection point 1461, first and second angled channel portions 1459 also intersect a stem channel portion 1463. Stem channel portion 1463 illustratively has a channel opening on the leading side of bearing surface 1448 and angled channel portion 1459 illustratively having openings on the sides of bearing surface 1448. In accordance with one aspect of the present invention, the angle formed by the intersection of channel portion 1459 with stem portion 1463 can be selected so as to enable beneficial slider flight performance characteristics. Precisely which flight performance characteristics are beneficial or desirable is dependent at least upon the nature and environment of a given slider application and the structural characteristics of a given slider. It should also be pointed out that channel 1449 can have a shape other than a "Y" shape. For example, channel 1449 could have a "U". "V" or some other shape.

In summary, one embodiment of the present invention pertains to a disc head slider (200, 900, 1000, 1100, 1200 and 1300) that includes a disc-facing surface (203, 903, 1003, 1103, 1203 and 1303). The disc-facing surface (203, 903, 1003, 1103, 1203 and 1303) comprises an inside set (214, 914, 1014, 1114, 1214, 1314) of surface components that includes an inside cavity dam (232, 932, 1032, 1132, 1232) and an inside sub-ambient pressure cavity (250, 950, 1050, 1150, 1250) having an inside cavity floor (252, 952, 1052, 1152, 1223, 1224). The disc-facing surface (203, 903, 1003, 1103, 1203 and 1303) further comprises an outside set (216, 916, 1016, 1116, 1216, 1316) of surface components that includes an outside cavity dam (988, 1230) and an outside sub-ambient pressure cavity having an outside cavity floor (1223, 1224). The disc-facing surface (203, 903, 1003, 1103, 1203 and 1303) also comprises a center set (218, 918, 1018, 1118, 1218 and 1318) of surface components that is generally disposed between the inside (214, 914, 1014, 1114, 1214 and 1314) and outside (216, 916, 1016, 1116, 1216 and 1316) sets of surface components. The center set (218, 918, 1018, 1118, 1218 and 1318) of surface components includes a center cavity dam (602, 905, 1180) and a center sub-ambient pressure cavity (610, 1284) having a center cavity floor (610, 1286). The inside (214, 914, 1014, 1114, 1214 and 1314), outside (216, 916, 1016, 1116, 1216 and 1316) and center (218, 918, 1018, 1118, 1218 and 1318) sets of surface components are separate and disassociated from one another.

Another embodiment pertains to a disc head slider (200) comprising a disc-facing surface (203) having a peripheral edge. The peripheral edge includes a leading edge (210), a trailing edge (212) and side edges (206 and 208) joining the leading edge (210) and the trailing edge (212). The disc-facing surface (203) further comprises a first set (214 or 216) of surface components that includes a first cavity dam (232) and a first sub-ambient pressure cavity (250) having a first cavity floor (252). The disc-facing surface (203) also comprises a second set (218) of surface components that includes a second cavity dam (602) and a second sub-ambient pressure cavity (608) having a second cavity floor (610). The first set (214 or 216) of surface components is positioned between the second set (218) of surface components and a side edge (206 or 208). The disc-facing surface (203) further comprises a leading surface component (220 or 222) generally positioned between the leading edge (210) and the first set (214 or 216) of surface components. A plurality of recessed surfaces (266, 268, 270 and 272) generally surround the first set (214 or 216) of surface components and separate the first set (214 or 216) of surface components from the second set (218) of surface components, the leading surface component (220 or 222), the trailing edge (212) and the side edge (206 or 208).

Another embodiment pertains to a disc head slider (1400, 1600) having a disc-facing surface (1403). The disc-facing surface (1403) includes a cavity dam (1430) and a sub-ambient pressure cavity (1442) having a cavity floor (1443). The disc-facing surface (1403) also includes an inside rail (1414) disposed on a first side of the sub-ambient pressure cavity (1442), and an outside rail (1416) disposed on a second side of the sub-ambient pressure cavity (1442). The disc-facing surface (1403) also includes a center pad (1445) having a step surface (1446) and a bearing surface (1448). A "Y" shaped channel (1449) is formed in the bearing surface (1448).

It is to be understood that even though numerous characteristics and advantages of various embodiments of the invention have been set forth in the foregoing description, together with details of the structure and function of various embodiments of the invention, this disclosure is illustratively only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiment described herein is directed to a disc head slider having a specialized disc-facing surface configurations, it will be appreciated by those skilled in the art that the teaching of the present invention can be applied to other types of sliders, such as a positive pressure slider having no cavity dam and sliders having different numbers of rails and rail shapes without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A slider comprising:
  an air-bearing surface, wherein the air-bearing-surface comprises:
   an inside set of surface components that includes an inside cavity dam and an inside sub-ambient pressure cavity having an inside cavity floor;

an outside set of surface components that includes an outside cavity dam and an outside sub-ambient pressure cavity having an outside cavity floor; and
a center set of surface components generally disposed between the inside and outside sets of surface components, wherein the center set of surface components includes a center cavity dam, a center sub-ambient pressure cavity having a center cavity floor and a set of rails that surround the center sub-ambient pressure cavity, and wherein the inside, outside and center sets of surface components are separate and disassociated from one another.

2. The slider of claim 1, wherein the air-bearing surface further comprises:
a first recessed surface disposed between the center and inside set of surface components; and
a second recessed surface disposed between the center and outside set of surface components.

3. The slider of claim 2, wherein the air-bearing surface further comprises a leading edge and a trailing edge, and wherein the first and second recessed surfaces generally extend between the leading edge and the trailing edge of the air bearing surface.

4. The slider of claim 2, wherein at least one of the inside and outside cavity dams includes a surface portion that forms at least a portion of a bearing surface that is generally disposed in a bearing surface plane.

5. The slider of claim 4, wherein the first and second recessed surfaces are further disposed from the bearing surface plane than the inside, outside and center cavity floors.

6. The slider of claim 4, wherein the first and second recessed surfaces are disposed a distance from the bearing surface plane that is at least twice as far as the distance which the inside, outside and center cavity floors are disposed from the bearing surface plane.

7. The slider of claim 4, wherein the first and second recessed surfaces are disposed a distance from the bearing surface plane that is in the range of approximately 8 to 10 microns.

8. The slider of claim 4, wherein the first and second recessed surfaces are disposed a distance from the bearing surface plane that is at least 6 microns.

9. The slider of claim 8, wherein the inside, outside and center cavity floors are disposed a distance from the bearing surface plane that is in the range of approximately 2 to 3 microns.

10. The slider of claim 4, wherein the air-bearing surface further comprises:
an inside edge;
an outside edge;
a third recessed surface disposed between the inside set of surface components and the inside edge of the air-bearing surface; and
a fourth recessed surface disposed between the outside set of surface components and the outside edge of the air-bearing surface.

11. The slider of claim 10, wherein the air-bearing surface further comprises a leading edge and a trailing edge, and wherein the first, second, third and fourth recessed surfaces generally extend between the leading edge and the trailing edge of the air bearing surface.

12. The slider of claim 10, wherein the first, second, third and fourth recessed surfaces are further disposed from the bearing surface plane than the inside, outside and center cavity floors.

13. The slider of claim 10, wherein the first, second, third and fourth recessed surfaces are disposed a distance from the bearing surface plane that is at least twice as far as the distance which the inside, outside and center cavity floors are disposed from the bearing surface plane.

14. The slider of claim 10, wherein the first, second, third and fourth recessed surfaces are disposed a distance from the bearing surface plane that is in the range of approximately 8 to 10 microns.

15. The slider of claim 10, wherein the first, second, third and fourth recessed surfaces are disposed a distance from the bearing surface plane that is at least 6 microns.

16. The slider of claim 15, wherein the inside, outside and center cavity floors are disposed a distance from the bearing surface plane that is in the range of approximately 2 to 3 microns.

17. The slider of claim 1, wherein the inside cavity dam has an inside cavity dam width, the outside cavity dam has an outside cavity dam width, and the center cavity dam has a center cavity dam width, the inside and outside cavity dam widths being at least twice as wide as the center cavity dam width.

18. The slider of claim 1, wherein the inside cavity dam has an inside cavity dam width, the outside cavity dam has an outside cavity dam width, and the center cavity dam has a center cavity dam width, the center cavity dam width being at least twice as wide as the inside and outside cavity dam widths.

19. The slider of claim 1, wherein at least one of the inside and outside cavity dams includes an angled leading edge.

20. The slider of claim 19, wherein the air-bearing surface further comprises a leading edge, and wherein said angled leading edge is angled from a first corner point to a second corner point, one of the first and second corner points being further displace from the leading edge of the air-bearing surface than the other.

21. The slider of claim 1, wherein:
the air-bearing surface further comprises a leading edge;
at least one of the inside and outside cavity dams includes a cavity dam upper surface and a cavity dam leading surface; and
at least one of the cavity dam upper surface and the cavity dam leading surface has an angled leading edge that is angled from a first corner point to a second corner point, one of the first and second corner points being further displaced from the leading edge of the air-bearing surface than the other.

22. The slider of claim 1, wherein the air-bearing surface further comprises a leading edge, and wherein at least a portion of one of the inside and outside cavity dams is positioned generally proximate the leading edge of the air-bearing surface.

23. The slider of claim 1, wherein the center cavity dam includes an angled leading edge.

24. The slider of claim 23, wherein the air-bearing surface further comprises a leading edge, and wherein said angled leading edge is angled from a center point to two corner points, the corner points being further displaced from the leading edge of the air-bearing surface than the center point.

25. A slider comprising an air-bearing surface, wherein the air-bearing surface comprises:
a peripheral edge comprising a leading edge, a trailing edge and side edges joining the leading edge and the trailing edge;
a first set of surface components that includes a first cavity dam and a first sub-ambient pressure cavity having a first cavity floor;

a second set of surface components that includes a second cavity dam and a second sub-ambient pressure cavity having a second cavity floor, the first set of surface components being positioned between the second set of surface components and a side edge;

a leading surface component generally positioned between the leading edge and the first set of surface components; and a plurality of recessed surfaces that generally surround the first set of surface components and separate the first set of surface components from the second set of surface components, the leading surface component, the trailing edge and the side edge, wherein the leading surface component is separated from the first set of surface components by a surface having a depth that is greater than the first cavity floor.

26. The slider of claim 25, wherein:

the leading surface component has an angled trailing edge; and the first cavity dam has an angled leading edge that is generally parallel with the angled trailing edge of the leading surface component.

27. The slider of claim 25, wherein the first cavity dam includes a surface portion that forms at least a portion of a bearing surface that is generally disposed in a bearing surface plane.

28. The slider of claim 27, wherein the plurality of recessed surfaces are disposed a distance from the bearing surface plane that is at least twice as far as the distance which the first and second cavity floors are disposed from the bearing surface plane.

29. The slider of claim 27, wherein the plurality of recessed surfaces are disposed a distance from the bearing surface plane that is at least 6 microns.

* * * * *